(12) United States Patent
Jones et al.

(10) Patent No.: US 12,199,985 B2
(45) Date of Patent: Jan. 14, 2025

(54) MULTI-MODAL USER AUTHORIZATION IN GROUP-BASED COMMUNICATION SYSTEMS

(71) Applicant: Salesforce, Inc., San Francisco, CA (US)

(72) Inventors: Leah Jones, San Francisco, CA (US); Ilan Frank, Los Altos, CA (US); Rosaleen Nguyen, San Francisco, CA (US); Kevin Marshall, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 782 days.

(21) Appl. No.: 16/201,515

(22) Filed: Nov. 27, 2018

(65) Prior Publication Data
US 2020/0169559 A1 May 28, 2020

(51) Int. Cl.
*H04L 9/40* (2022.01)
*H04L 12/18* (2006.01)

(52) U.S. Cl.
CPC ............ *H04L 63/101* (2013.01); *H04L 12/18* (2013.01); *H04L 63/102* (2013.01)

(58) Field of Classification Search
CPC ... H04L 63/101; H04L 63/102; H04L 63/104; H04L 12/18; H04L 12/185
USPC .......................................................... 726/4
See application file for complete search history.

(56) References Cited

U.S. PATENT DOCUMENTS

| 7,426,540 | B1 * | 9/2008 | Matsumoto | H04L 12/1822 |
| | | | | 709/203 |
| 8,805,996 | B1 * | 8/2014 | Gauvin | H04L 51/32 |
| | | | | 709/224 |
| 9,094,407 | B1 * | 7/2015 | Matthieu | H04L 63/102 |
| 9,800,525 | B1 * | 10/2017 | Lerner | H04L 51/36 |
| 10,033,676 | B2 * | 7/2018 | Miyamoto | H04L 51/16 |

(Continued)

OTHER PUBLICATIONS

Victor Luckerson, "Make Your Facebook Profile More Private in 6 Easy Steps", "https://time.com/4166749/facebook-privacy-settings-guide/", Jan. 5, 2016 (Year: 2016).*

(Continued)

*Primary Examiner* — Michael W Chao
*Assistant Examiner* — Peiliang Pan
(74) *Attorney, Agent, or Firm* — Holland & Hart LLP

(57) ABSTRACT

Method, apparatus and computer program product for multi-modal user authorization are described herein. For example, the apparatus includes at least one processor and at least one non-transitory memory including program code. The at least one non-transitory memory and the program code are configured to, with the at least one processor, receive a request to enable a first client device associated with a first user profile to access a group-based communication system; determine a first access privilege status for the first user profile; in response to determining that the first access privilege status is a general access privilege status, transmit, to the first client device, first user interface data associated with a general access user interface; and in response to determining that the first access privilege status is a limited access privilege status, transmit, to the first client device, second user interface data associated with a limited access user interface.

20 Claims, 14 Drawing Sheets

(56) References Cited

U.S. PATENT DOCUMENTS

| | | | |
|---|---|---|---|
| 10,074,371 B1* | 9/2018 | Wang | G10L 15/30 |
| 10,171,386 B1* | 1/2019 | Pendap | H04L 51/14 |
| 10,594,757 B1* | 3/2020 | Shevchenko | G06F 40/186 |
| 2006/0010240 A1* | 1/2006 | Chuah | H04L 67/24 |
| | | | 709/228 |
| 2006/0090137 A1* | 4/2006 | Cheng | G06F 3/0482 |
| | | | 715/758 |
| 2007/0016663 A1* | 1/2007 | Weis | G06F 11/2041 |
| | | | 709/223 |
| 2007/0208569 A1* | 9/2007 | Subramanian | G10L 19/0018 |
| | | | 704/270 |
| 2008/0299954 A1* | 12/2008 | Wright | H04L 67/303 |
| | | | 455/414.1 |
| 2008/0305765 A1* | 12/2008 | Eisenberg | H04L 12/189 |
| | | | 455/406 |
| 2008/0320085 A1* | 12/2008 | Bouilloux-Lafont | |
| | | | H04N 21/4786 |
| | | | 709/206 |
| 2009/0098855 A1* | 4/2009 | Fernandez | H04M 1/72463 |
| | | | 455/410 |
| 2010/0144324 A1* | 6/2010 | Wright | H04W 4/16 |
| | | | 455/414.1 |
| 2012/0137254 A1* | 5/2012 | Cunningham | G06Q 10/107 |
| | | | 715/835 |
| 2013/0073583 A1* | 3/2013 | Licata | G06K 9/00463 |
| | | | 707/769 |
| 2013/0254830 A1* | 9/2013 | Moganti | H04L 41/00 |
| | | | 726/1 |
| 2014/0172917 A1* | 6/2014 | Coroy | H04L 51/32 |
| | | | 707/783 |
| 2014/0195641 A1* | 7/2014 | Wang | H04L 67/327 |
| | | | 709/217 |
| 2015/0026269 A1* | 1/2015 | Canton | H04L 51/32 |
| | | | 709/206 |
| 2015/0163206 A1* | 6/2015 | McCarthy | G06F 21/10 |
| | | | 713/171 |
| 2015/0278750 A1* | 10/2015 | Bhagat | G06Q 10/063114 |
| | | | 705/7.15 |
| 2015/0294631 A1* | 10/2015 | Jung | G06Q 10/00 |
| | | | 345/212 |
| 2016/0057154 A1* | 2/2016 | Ferguson | H04L 63/08 |
| | | | 726/7 |
| 2016/0364368 A1* | 12/2016 | Chen | G06F 3/0482 |
| 2017/0011398 A1* | 1/2017 | Narasimhan | G06Q 20/108 |
| 2017/0243013 A1* | 8/2017 | Herlocher | G06Q 20/3223 |
| 2017/0312457 A1* | 11/2017 | DeSalvo | G16H 20/13 |
| 2017/0374075 A1* | 12/2017 | Boval | H04L 51/22 |
| 2018/0063687 A1* | 3/2018 | Peterson | H04W 4/14 |
| 2018/0197144 A1* | 7/2018 | Frank | H04W 12/08 |
| 2018/0249412 A1* | 8/2018 | Zhou | H04W 52/0216 |
| 2018/0260782 A1* | 9/2018 | Bay | G06Q 10/107 |
| 2018/0287982 A1 | 10/2018 | Draeger et al. | |
| 2018/0337963 A1* | 11/2018 | Faulkner | H04L 67/26 |
| 2019/0065258 A1* | 2/2019 | Irudayaraj | H04L 67/1002 |
| 2019/0261392 A1* | 8/2019 | Morris | H04W 72/1284 |
| 2020/0311631 A1* | 10/2020 | Hecht | G06Q 10/067 |
| 2021/0019755 A1* | 1/2021 | Omojola | G06Q 20/40 |
| 2021/0049527 A1* | 2/2021 | Beaumont | G06Q 50/265 |
| 2021/0158238 A1* | 5/2021 | Clearwater | G06F 21/6245 |
| 2021/0232644 A1* | 7/2021 | Shah | H04L 51/04 |
| 2021/0342759 A1* | 11/2021 | Beaumont | G06F 15/76 |
| 2021/0390470 A1* | 12/2021 | Clearwater | G06Q 10/0635 |
| 2022/0101235 A1* | 3/2022 | Khalil | G06Q 10/1097 |
| 2022/0156657 A1* | 5/2022 | Brannon | G06Q 10/067 |
| 2022/0164840 A1* | 5/2022 | Barday | G06Q 10/0635 |

OTHER PUBLICATIONS

Wikipedia:Request for permissions, https://web.archive.org/web/20171011035524/https://en.wikipedia.org/wiki/Wikipedia:Requests_for_permissions, Oct. 11, 2017 (Year: 2017).*

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

Robert Hof, "Stewart Butterfield on How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 pm), 3 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516> (dated Oct. 31, 2014) 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 am) 3 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 pm), 2 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 pm) 4 pages.

Internet Relay Chat, Wikipedia, , [online][retrieved May 30, 2019]. Retrieved from the Internet: <URL: https://en.wikipedia.org/wiki/Internet_Relay_Chat>. (dated May 28, 2019) 17 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 pm) 8 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 pm) 2 pages.

Matsumoto, T. et al., "Chocoa Communicator—A New Communication System Based on Awareness and Text Communications—", Fujitsu Sci. Tech. J., 36, 2, (Dec. 2000) 154-161.

* cited by examiner

MULTI-MODAL USER AUTHORIZATION IN GROUP-BASED COMMUNICATION SYSTEMS

BACKGROUND

Applicant has identified many deficiencies and problems associated with existing methods, apparatus, and systems related to user authorization in communication systems. Through applied effort, ingenuity, and innovation, many of these identified deficiencies and problems have been solved by developing solutions that are in accordance with embodiments of the present disclosure, many examples of which are described in detail herein.

BRIEF SUMMARY

In general, embodiments of the present disclosure provide methods, apparatus, systems, computing devices, and/or the like for multi-modal user authorization in group-based communication systems using access privilege identifiers, general access user interfaces, and limited access user interfaces.

In accordance with one aspect, an apparatus is provided. The apparatus comprises at least one processor and at least one non-transitory memory comprising program code. The at least one non-transitory memory and the program code are configured to, with the at least one processor, cause the apparatus to at least receive a first access request to enable a the first client device associated with a first user profile to access the group-based communication system; determine, based on a first access privilege identifier associated with the first access request, a first access privilege status associated with the first user profile; in response to determining that the first access privilege status is a general access privilege status, transmit, to the first client device associated with the first user profile, first user interface data associated with a general access user interface for display by the first client device, wherein: (i) the general access user interface enables the first client device to obtain active access to one or more first group-based communication interfaces of the group-based communication system, (ii) each first group-based communication interface of the one or more first group-based communication interfaces enables communication between one or more first user profiles of the group-based communication system via one or more first group-based communication channels associated with the first group-based communication interface, and (iii) the general access user interface displays each first communication of one or more first communications intended for display in a first group-based communication channel associated with a first group-based communication interface based on a conceptually hierarchical display layout; and in response to determining that the first access privilege status is a limited access privilege status, transmit, to the first client device associated with the first user profile, second user interface data associated with a limited access user interface for display by the first client device, wherein: (i) the limited access user interface is configured to enable the first client device to maintain active access to a first messaging communication interface associated with the group-based communication system, (ii) the first messaging communication interface enables communication between one or more second user profiles of the group-based communication system via one or more first ad-hoc communication channels, (iii) each first ad-hoc communication channel of the one or more first ad-hoc communication channels is associated with one or more third user profiles of the one or more second user profiles; and (iv) the limited access user interface displays each one or more second communications for a first ad-hoc communication channel based on a temporally linear display layout.

In some embodiments, the limited access user interface is further configured to enable the first client device to obtain passive access to the one or more first group-based communication interfaces. In some embodiments, the limited access user interface is further configured to: (i) disable the first client device from obtaining active access to the one or more first group-based communication interfaces, and (ii) disable the first client device from obtaining passive access to the one or more first group-based communication interfaces. In some embodiments, the second user interface is further configured to enable the first client device to obtain passive access to a first broadcast communication interface associated with the group-based communication system, wherein the broadcast communication interface enables communications between a fourth plurality of user profiles associated with the group-based communication system via one or more first broadcast communication channels. In some embodiments, the first access request includes the first access privilege identifier. In some embodiments, determining the first access privilege status comprises: identifying a first user identifier associated with the first user profile based on the first access request; and retrieving the first access privilege identifier by querying a user authorization database based on the user identifier.

In some embodiments, the at least one non-transitory memory and the program code are configured to, with the at least one processor, cause the apparatus to receive a modification command, the modification command comprising instructions to modify the first access privilege status; modify the first access privilege status based on the modification command. In some embodiments, the modification command is received from a second client device, the second client device associated with an administrator user profile for the group-based communication system. In some embodiments, the modification command is generated in response to a first modification request received from the first client device associated with the first user profile. In some embodiments, the modification command is generated in response to a second modification request received from a third computing device associated a third user profile authorized to obtain active access to at least one group-based communication interface of the group-based communication system.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

BRIEF DESCRIPTION OF THE DRAWINGS

Figure 1:
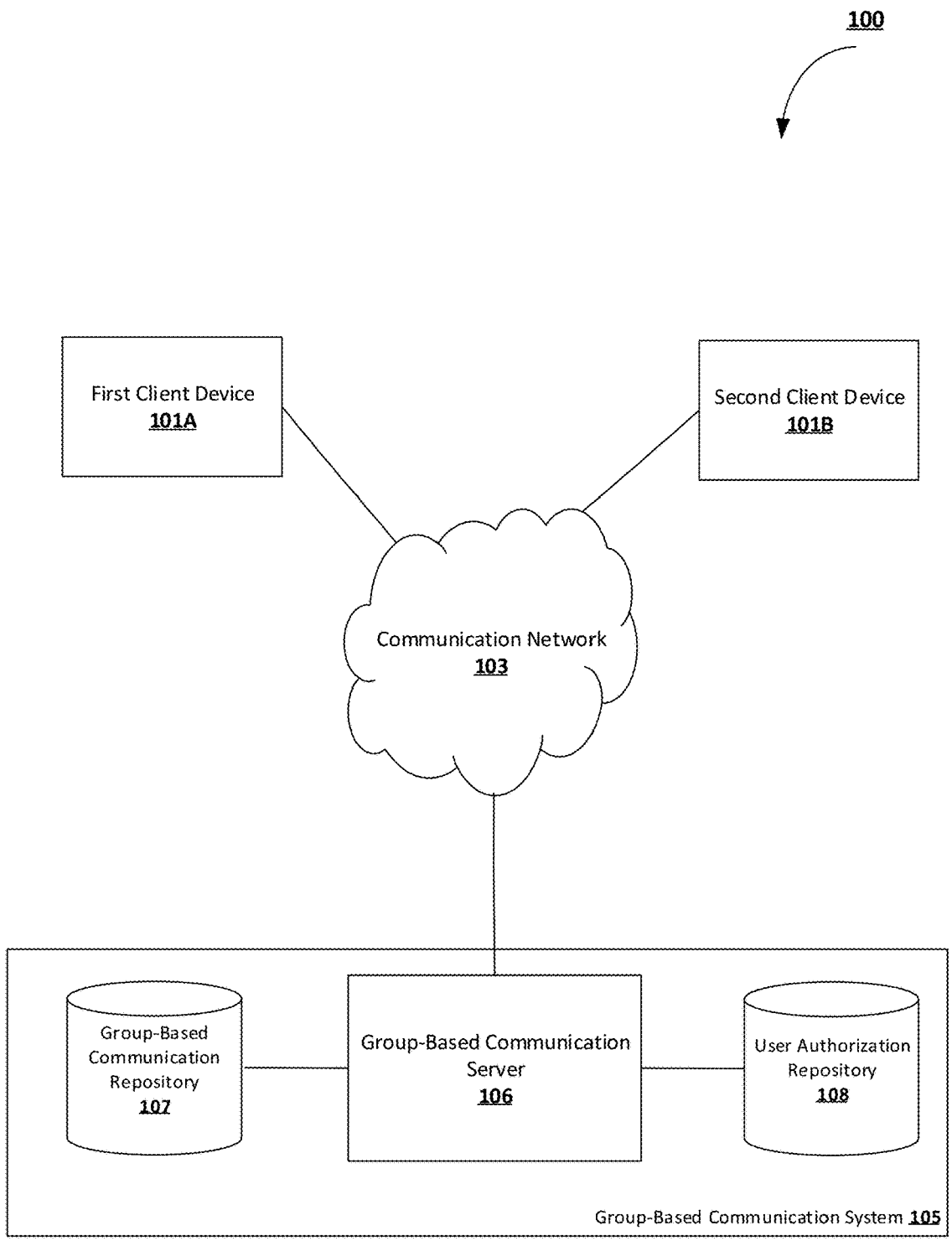

Having thus described some embodiments in general terms, references will now be made to the accompanying drawings, which are not necessarily drawn to scale, and wherein:

FIG. 1 is an example system architecture within which embodiments of the present disclosure may operate.

Figure 2:
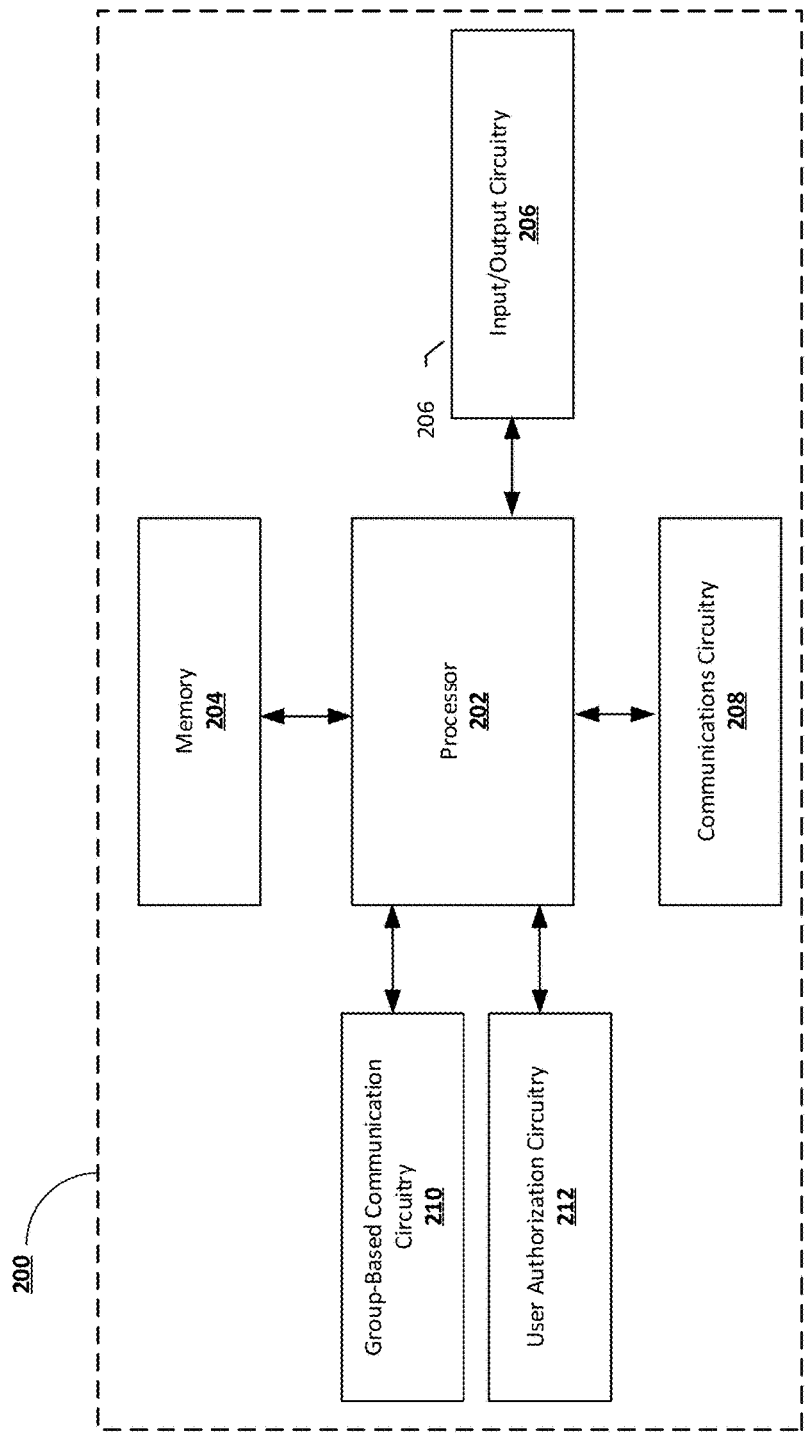

FIG. 2 is a schematic diagram of an example apparatus for a group-based communication server in accordance with one embodiment of the present disclosure.

Figure 3:
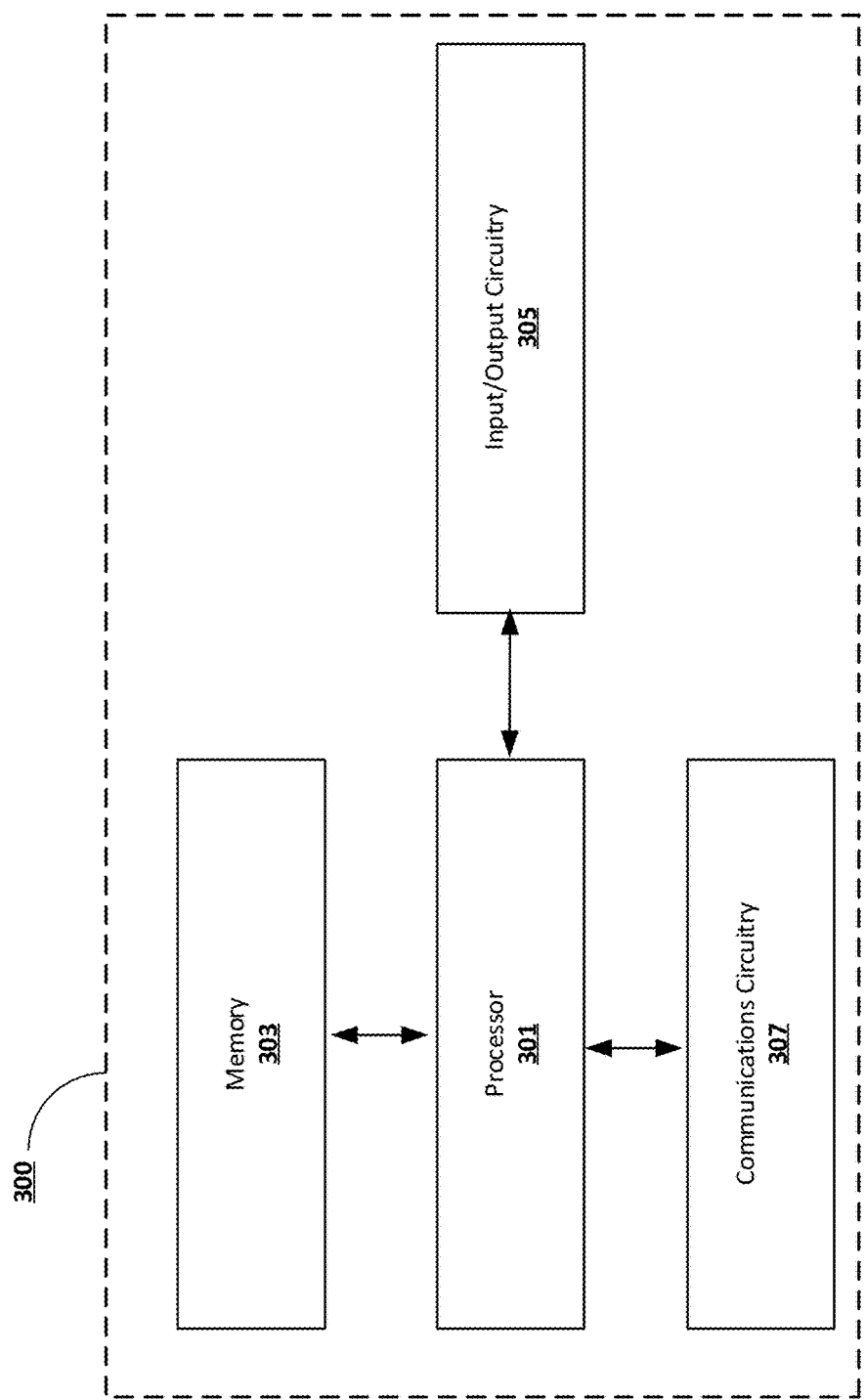

FIG. 3 is a schematic diagram of an example apparatus for a client device in accordance with one embodiment of the present disclosure.

Figure 4:
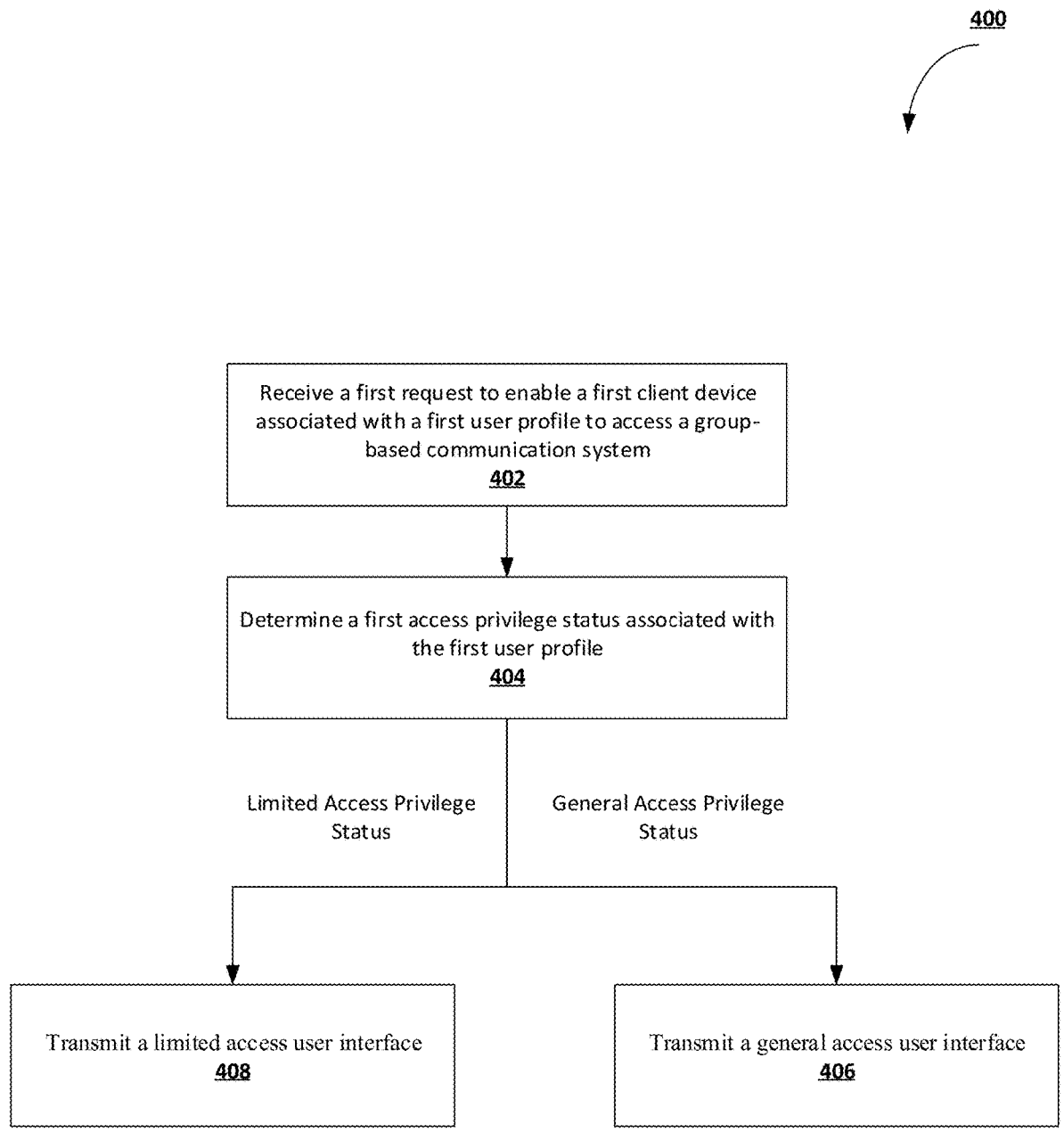

FIG. 4 is a flow diagram of a process for user authorization in a group-based communication system in accordance with one embodiment of the present disclosure.

Figure 5A:
Figure 5B:
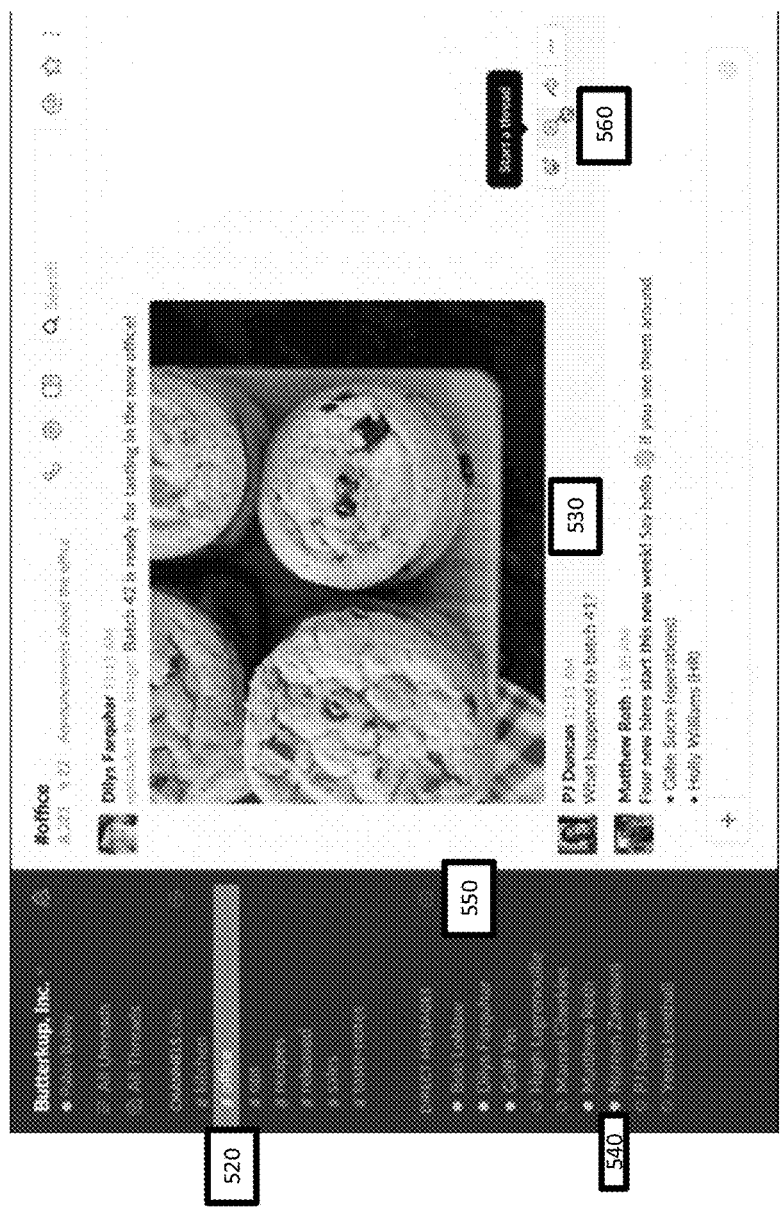
Figure 5C:
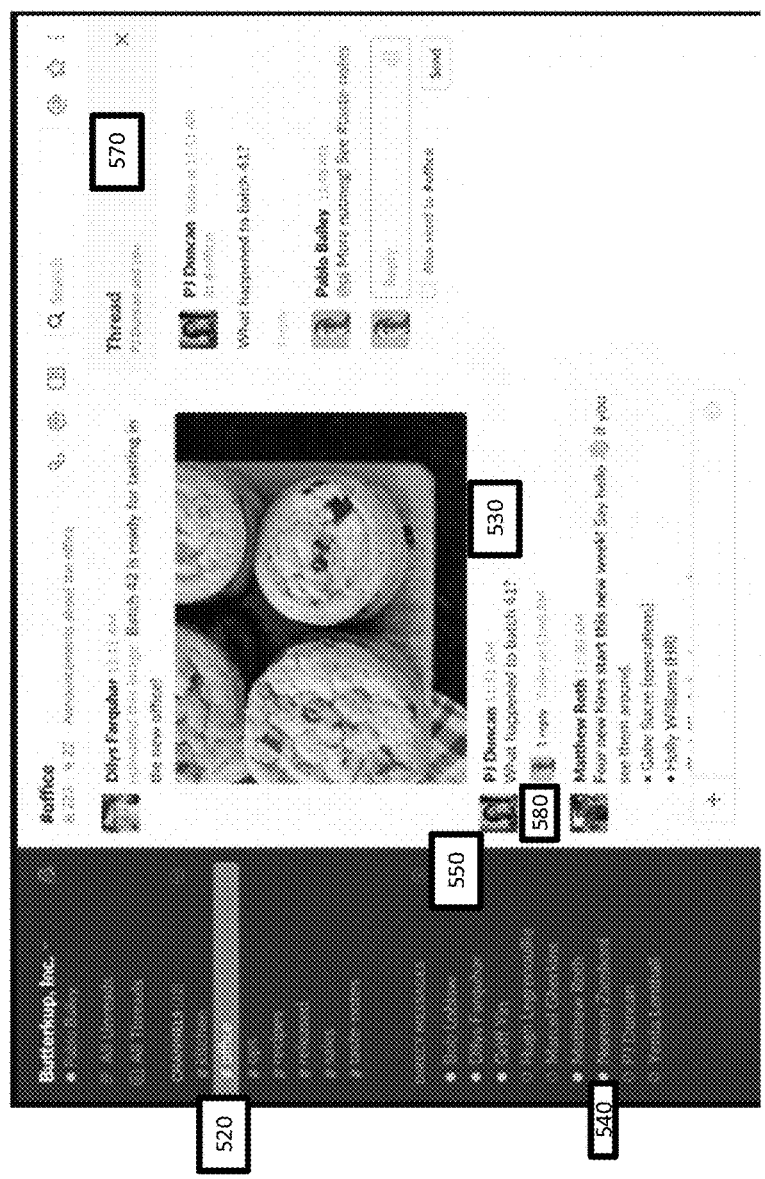

FIGS. 5A-5C depict an example general access user interface in accordance with one embodiment of the present disclosure.

Figure 6:
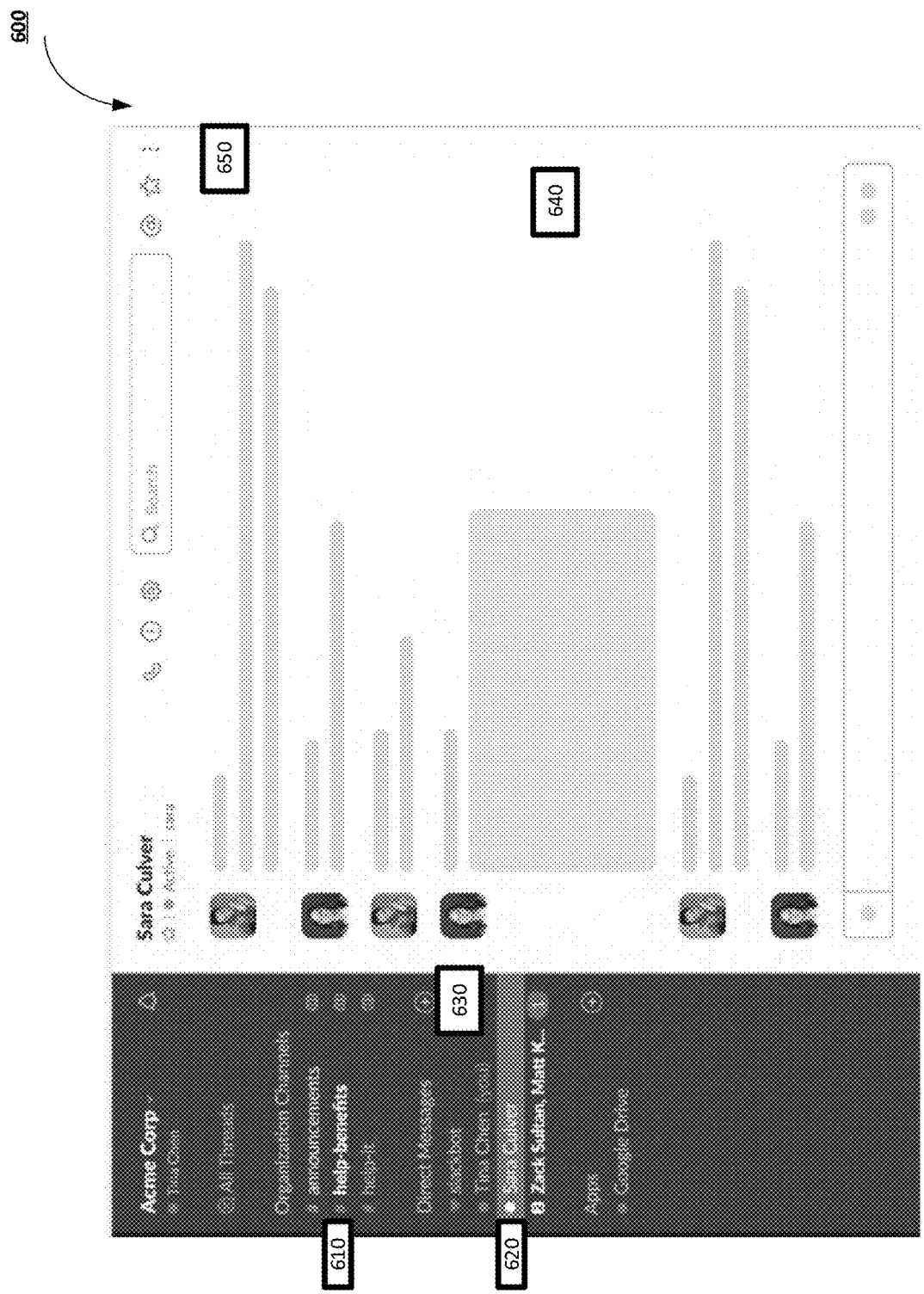

FIG. 6 is an example limited access user interface in accordance with one embodiment of the present disclosure.

Figure 7:
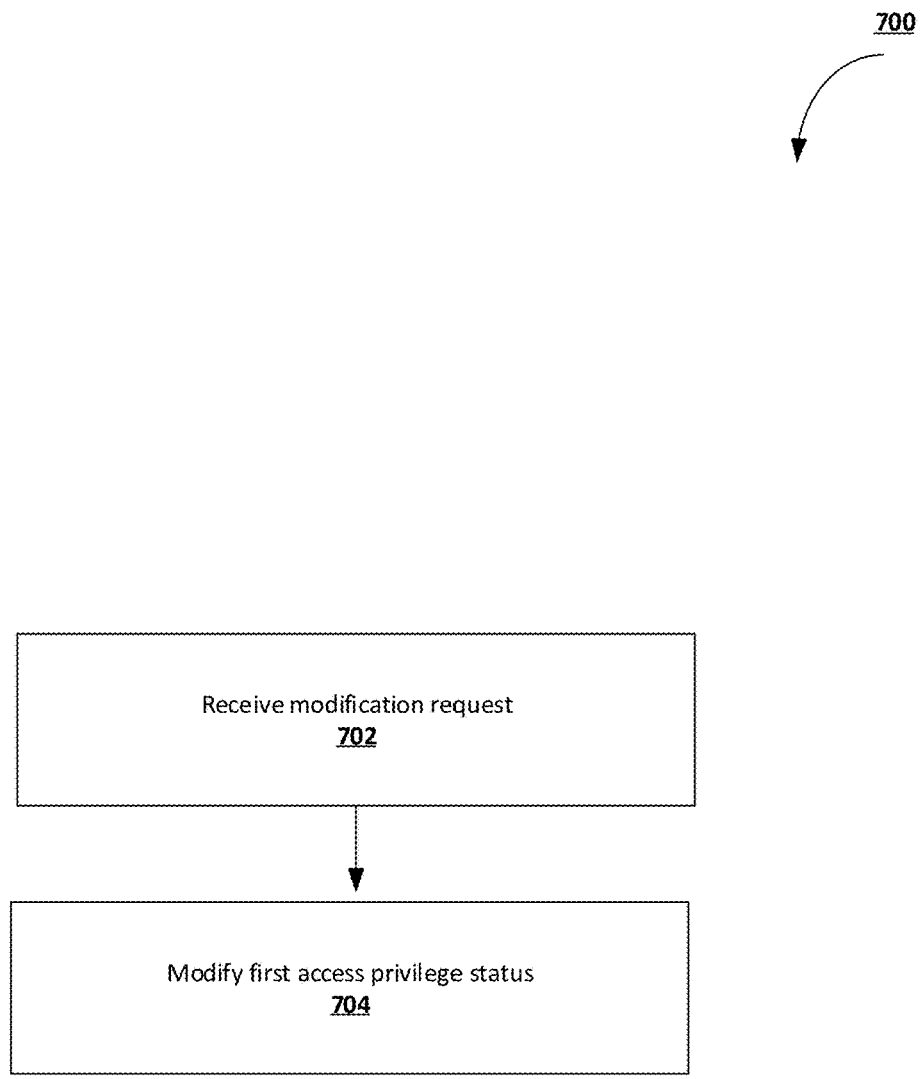

FIG. 7 is a flow diagram of a process for modifying an access privilege status in accordance with one embodiment of the present disclosure.

Figure 8:
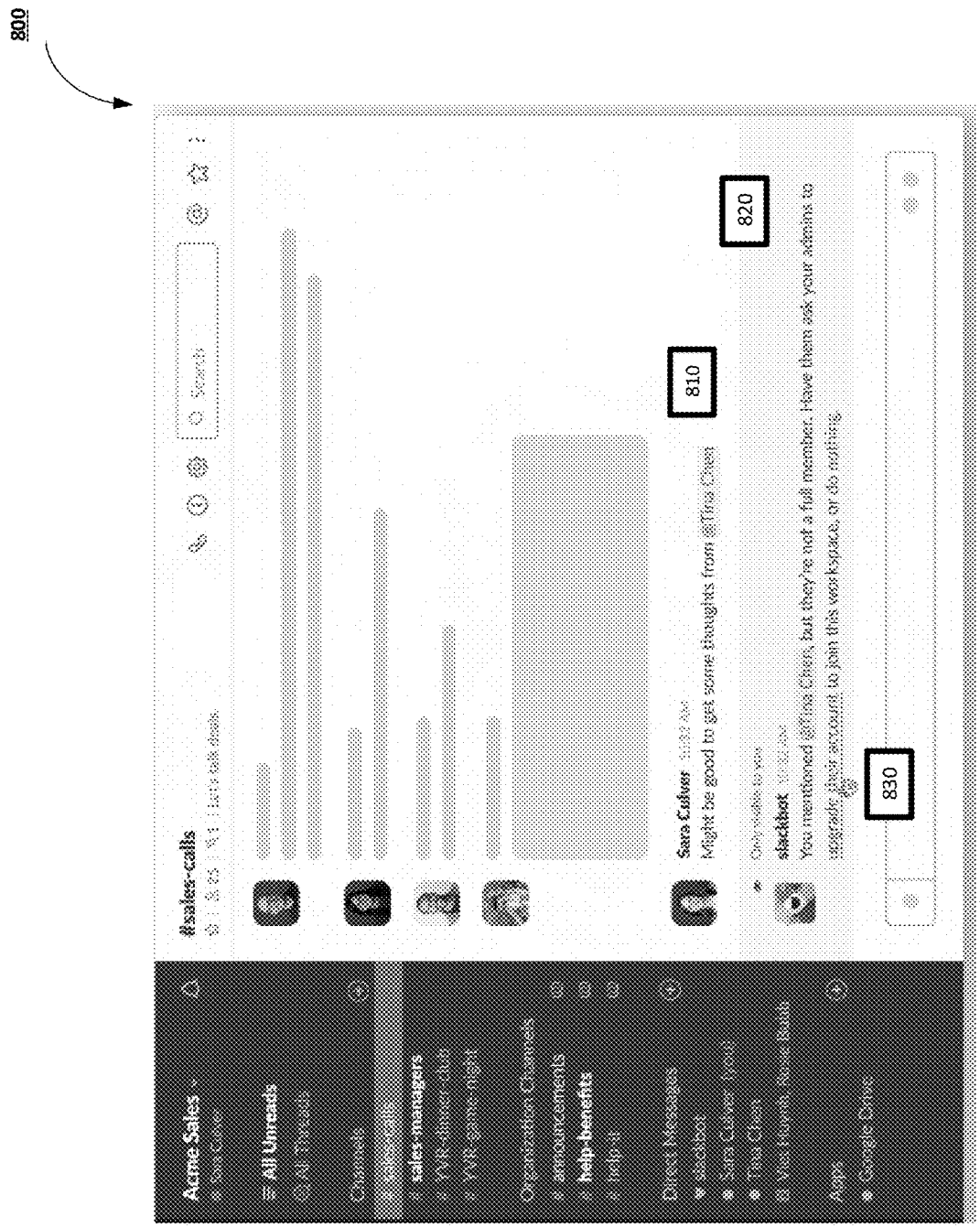

FIG. 8 is an example modification recommendation user interface in accordance with one embodiment of the present disclosure.

Figure 9:
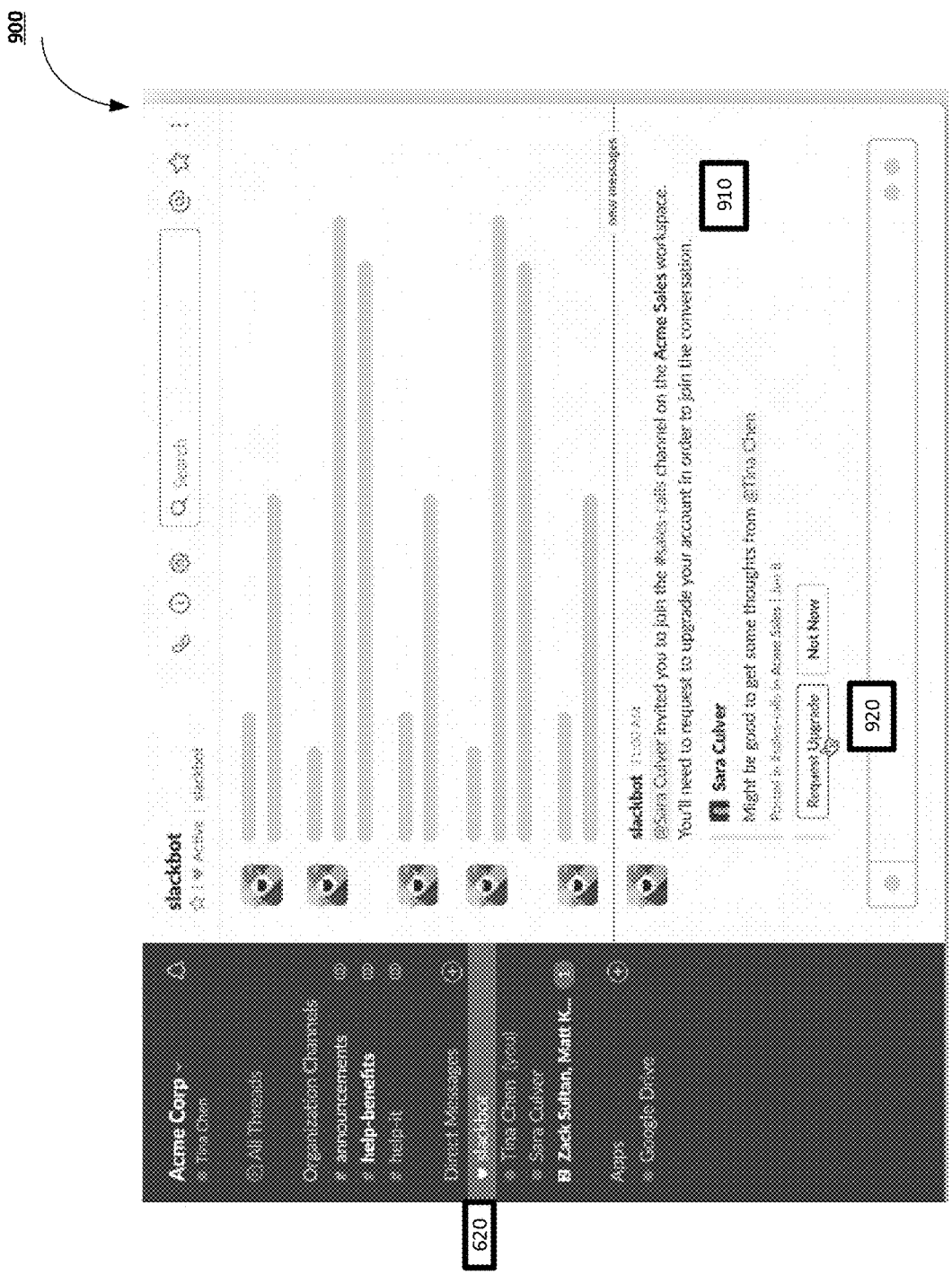

FIG. 9 is an example modification request user interface in accordance with embodiments of the present disclosure.

Figure 10:
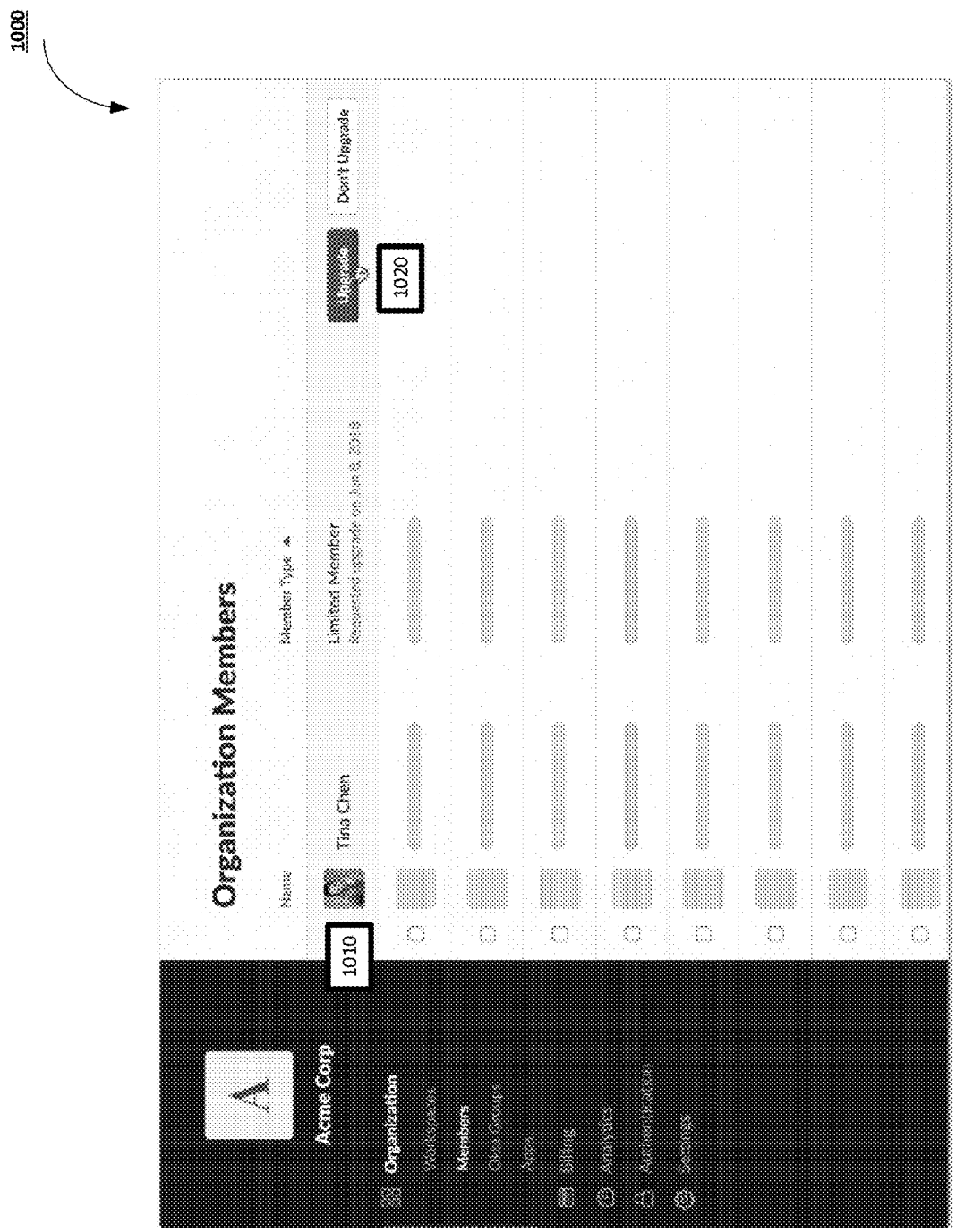

FIG. 10 is an example modification command user interface in accordance with embodiments of the present disclosure.

Figure 11A:
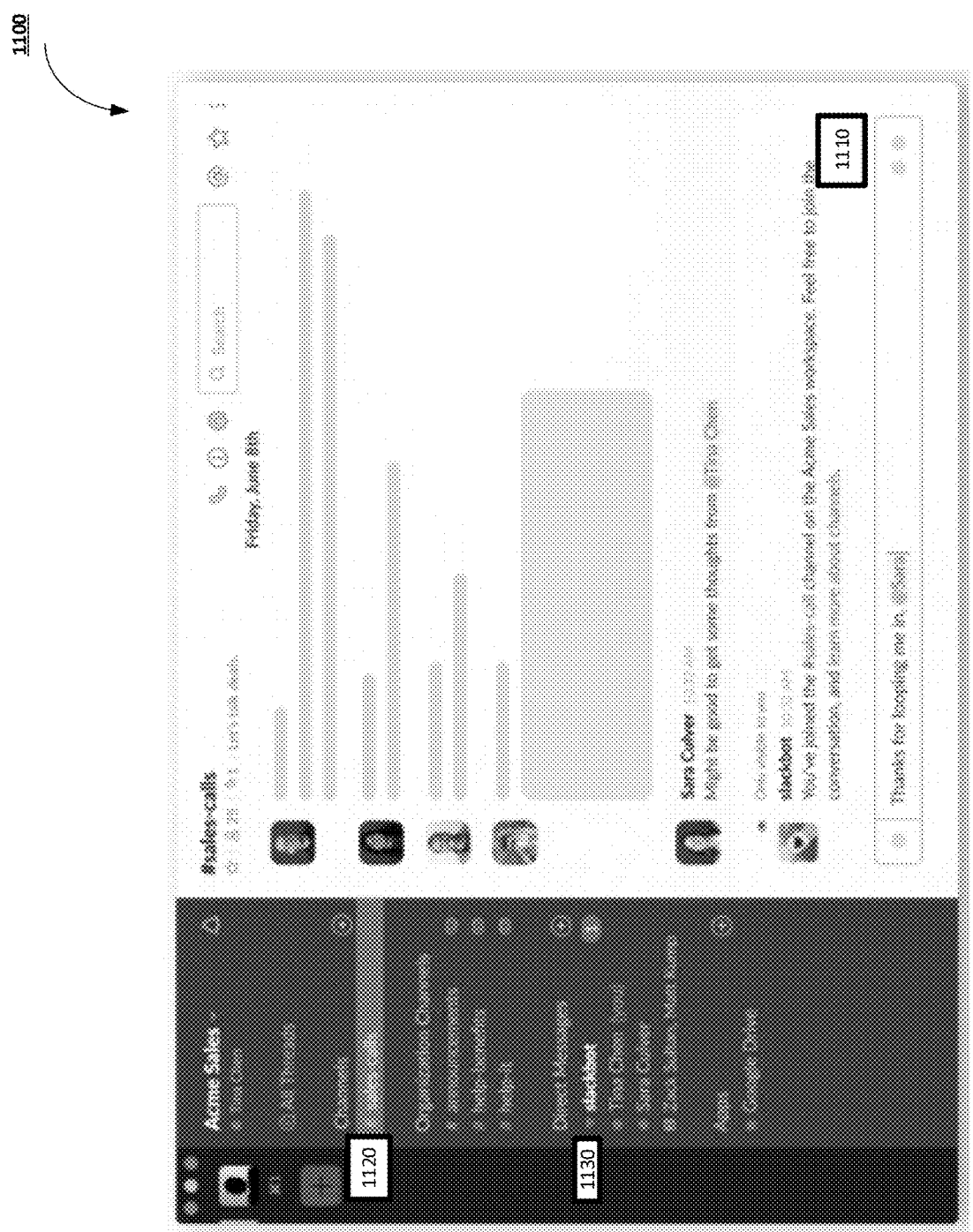
Figure 11B:
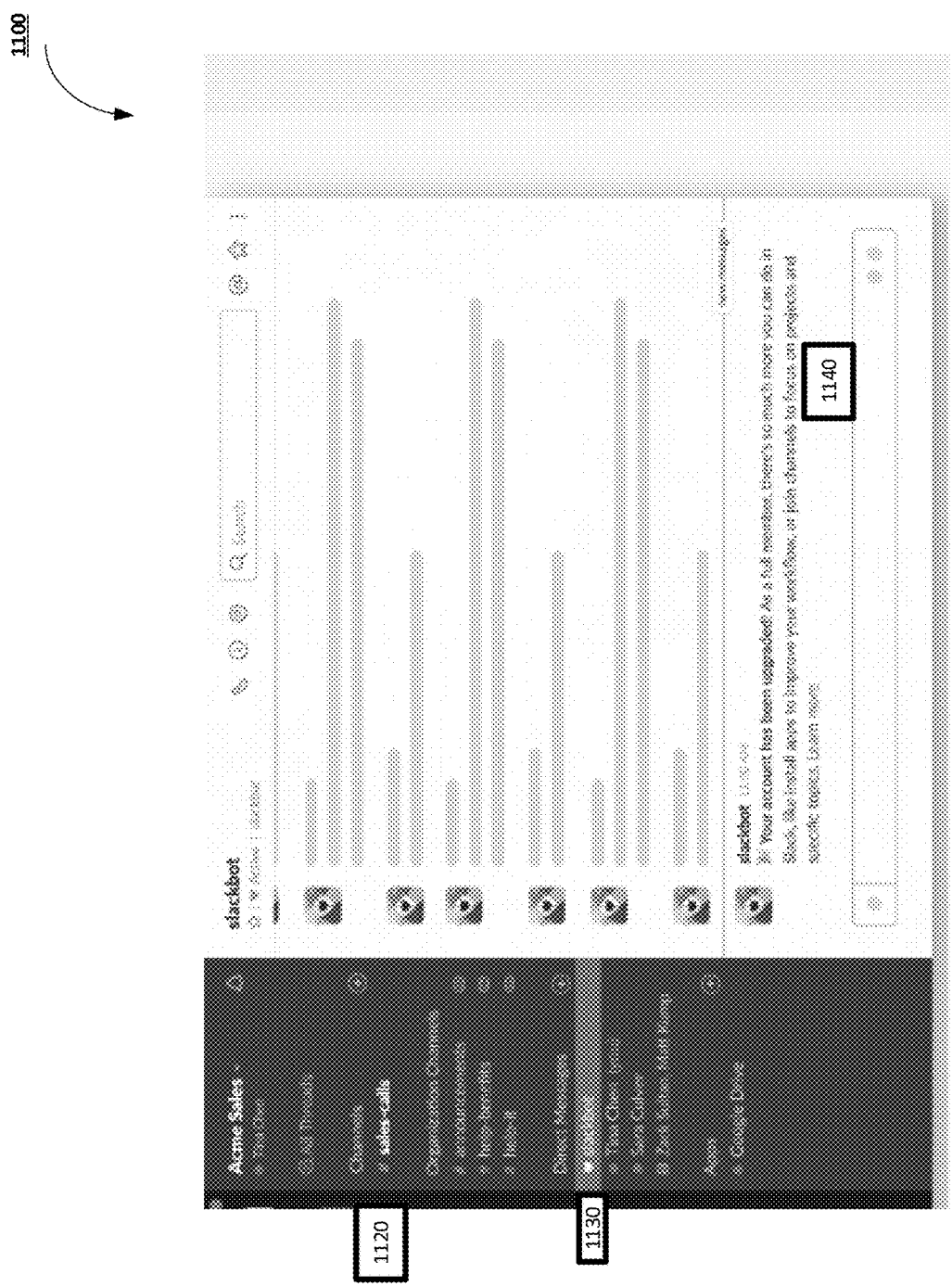

FIGS. 11A-B depict a post-modification general access user interface in accordance with one embodiment of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

Overview

Various embodiments of the present disclosure relate generally to multi-modal user authorization in group-based communication systems. More specifically, various embodiments of the present disclosure are related to group-based communication systems that provide multi-modal user authorization using access privilege identifiers, general access user interfaces, and limited access user interfaces. Various embodiments described hereinafter provide many technical improvements over computer functionalities by enabling providers of group-based communication systems to enforce more flexible user authorization parameters in those group-based communication systems. In addition, various embodiments of the present disclosure provide many technical improvements over computer functionalities by providing user authorization protocols that facilitate multi-modal user authorization in group-based communication systems. Furthermore, various embodiments of the present disclosure provide many technical improvements over computer functionalities by providing seamless and/or smooth transitions between user interfaces in the event of modifications in access privilege identifiers.

For example, various embodiments enable providers of group-based communication systems to define various modes of user authorization for various user profiles associated with the group-based communication system, where the various modes relate to the nature of communication interfaces provided by the group-based communication system. By enabling such multi-modal user authorization in group-based communication systems, various embodiments of the present disclosure enable providers of group-based communication systems to provide custom communication functionalities of varying types to various user profiles using the same overall group-based communication system. This in turn allows the providers to deploy a cross-platform communication system that simultaneously addresses the needs and requirements of various types of users as part of the same overall communication application. In this way, various embodiments of the present disclosure enhance user experience for users of group-based communication systems and reduce complexity of software resources needed to provide various communication functionalities in various systems and institutions.

Many large institutions are faced with significant challenges with respect to deployment and maintenance of their communication applications because of issues related to multiplicity of user needs and desires with respect to communication applications. Often, different categories of users in those institutions have different requirements and preferences with respect to communication applications. For example, some users require group-based communication interfaces configured to enable group-based communications using group-based communication channels, while other users require messaging interfaces configured to enable ad-hoc communications using ad-hoc communication channels, and yet others require broadcast communication interfaces configured to enable broadcast communications via one or more broadcast channels. The noted communication interfaces may each be vital to some category of users within larger institutions, and some users may need to maintain access to all three noted interfaces. In addition, organizational policies and needs may require granting some users active access to some communication interfaces so they can send and receive communications using the channels associated with those interfaces but granting other users merely passive access to some interfaces so they can only receive communications using channels associated with those interfaces.

A naïve solution to the above-noted multiplicity challenges faced by organizations with respect to communication applications is to deploy independent and separate applications for different categories of users. This has many drawbacks, such as inefficiencies associated with deployment and maintenance costs of various applications, inefficiencies associated with user unfamiliarity and confusion because of multiplicity of applications, and the cost to user experience incurred by multiplicity of applications and platforms. Various embodiments of the present disclosure relate to addressing such challenges by providing concepts for multi-modal authorization in a communication platform. For example, various embodiments of the present disclosure relate to a computer application that enables a first group of users to obtain active access to group-based communication interfaces, messaging communication interfaces, and broadcast communication interfaces; disables a second group of users from obtaining active access to the group-based communications; and enables the second group of users to obtain active access to messaging communication interfaces and broadcast communication interfaces. By enabling multi-modal user authorization in the above-noted manner, various embodiments of the present disclosure address technological challenges resulting from multiplicity of communication application requirements and contribute innovative concepts to technological challenges related to user authorization in communication applications and to designing structures and parameters of communication applications.

Further, to enable multi-modal user authorization, various embodiments of the present disclosure present innovative protocols for determining user access privilege status associated with a user of a group-based communication system based on an access privilege identifier for the user. A user access privilege status defines parameters for user authorization and may for example be inferred based on a value in a request by the user profile to access the group-based communication system or based on a user identifier. Therefore, various embodiments of the present disclosure relate to inferring a mode of user authorization from information contained in the access request by a user. In doing so, various embodiments of the present disclosure enable user authorization efficiently, with minimal user action, and using information that can be dynamically modified in the event of a corresponding modification in the access privilege status associated with user profile. Such contributions in turn address technological challenges related to user authorization, such as multi-modal authorization, as well as provide technological advantages for improving user experience, e.g., user experience in communication systems, such as group-based communication systems.

Moreover, to enable multi-modal user authorization, various embodiments of the present disclosure provide unique user interface configurations that allow for seamless and/or smooth user interface modifications in the event of changes in access privilege statuses. One of the major challenges associated with multi-modal authorization relates to designing user-friendly modification procedures as well as pre- and post-modification user interfaces that minimize distortions or degradations in user experience resulting from lack of familiarity with new user interface structures and elements. For example, various embodiments of the present disclosure relate to presenting a general access user interface configured to enable active access to group-based communication interfaces and a limited access user interface configured to disable active access to group-based communication interfaces but enable passive access to messaging communication interfaces. The noted user interfaces, and other user interfaces disclosed by various embodiments of the present disclosure, provide innovative concepts for seamless and/or smooth user interfaces in communication systems that enable multi-modal user authorization and user interaction with multiple communication interfaces of various types. In doing so, various embodiments of the present disclosure make important contributions to technological domains related to user interface design and provide technological solutions for rendering multi-modal communication applications in a user-friendly manner.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of communications (i.e., a plurality of messages), a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The term "user identifier" refers to one or more items of data by which a user profile may be uniquely identified. For example, the user identifier may be a unique identifier associated with a user profile of a group-based communication system that is assigned to the user profile by the group-based communication system upon registration of the user profile. As another example, the user identifier for a user profile may be defined based on an Internet protocol (IP) address associated with the user profile.

The term "user authorization" refers to controlling access by a user device associated with a user profile to a computer system, e.g., controlling the nature and extent of such access. For example, user authorization for a group-based communication system may include enabling a first client device associated with a first user profile to obtain active access to a first communication interface associated with a group-based communication and/or enabling a second client device associated with a second user profile to obtain passive access to a second communication interface associated with the group-based communication system.

The term "access privilege status" refers to data that establishes user authorization for a user profile and with respect to a computer system. The access privilege status defines nature and extent of access by a user profile to a computer system. For example, the access privilege status for a first user profile and a group-based communication system may define which communication interfaces of the group-based communication system the first user profile has active access to, which communication interfaces of the group-based communication system the first user profile has passive access to, and which communication interfaces of the group-based communication system the first user profile has neither active nor passive access to.

The term "access privilege identifier" refers to one or more items of data by which an access privilege status may be uniquely identified. For example, the access privilege identifier may be a tag or label in an access request from a user profile that indicates the access privilege status for the user profile. As another example, the access privilege identifier may be an item of data in a user authorization database that indicates the access privilege status for a user profile, e.g., based on a user identifier for the user profile.

The term "user authorization database" refers to one or more items of data that identify, for each user identifier associated with a user profile, an access privilege status associated with the user identifier. The user authorization database may, for example, be a relational database (e.g., MySQL) database or a non-relational database (e.g., a JavaScript Object Notation (JSON) or NoSQL) database.

The term "administrator user profile" refers to a user profile that is configured to cause a computing device associated with the administrator user profile to transmit commands configured to establish or modify one or more access privilege statuses associated with a computer system. For example, the administrator user profile for a group-based communication system may cause transmission of modification commands configured to modify at least one access privilege status associated with the group-based communication system.

The term "access request" refers to data transmitted by a computing device associated with a user profile to obtain access to a computer system (e.g., a group-based communication system). For example, the access request could be a hypertext transfer protocol (HTTP) command.

The term "modification command" refers to data transmitted by a computing device (e.g., a computing device associated with an administrator user profile for a computer system and/or a computing device associated with a user profile for a computer system) to a computer system that is configured to cause the computer system to modify at least one access privilege status associated with the computer system. For example, the computing device associated with the administrator user profile for the group-based communication system may transmit a modification command to the group-based communication system, where the modification command is configured to modify the access privilege status for a first user profile of the group-based communication system. The computing device associated with the administrator user profile may transmit the modification command in response to at least one of: (i) a first modification request transmitted by a computing device associated with the first user profile, (ii) a second modification request transmitted by a computing device associated with a second user profile of the group-based communication system; and (iii) an indication by the administrator user profile that an administrator user associated with the administrator user profile has consented (e.g., through interactions with the computing device associated with the administrator user profile) to a particular modification in the access privilege status for the group-based communication system.

The term "modification request" refers data transmitted by a computing device associated with a user profile for a computer system that is configured to indicate to the computer system a request for modifying at least one access privilege status for the computer system. For example, a computing device associated a first user profile for the group-based communication system may transmit a modification request to the group-based communication system to modify the access privilege status for the first user profile. The computer system for the first user profile may transmit such a modification request in response to an indication by the first user profile that a first user associated with the first user profile has expressed (e.g., through interactions with the computing device associated with the first user profile) an interest in a particular modification in the access privilege status for the first user profile. As another example, a computing device associated a first user profile for the group-based communication system may transmit a modification request to the group-based communication system to modify the access privilege status for a second user profile of the group-based communication system. The computer system for the first user profile may transmit such a modification request in response to an indication by the first user profile that a first user associated with the first user profile has expressed (e.g., through interactions with the computing device associated with the first user profile) an interest in a particular modification in the access privilege status for the second user profile.

The term "communication interface" refers to a virtual environment configured to enable at least some of user profiles of a computer system to interact with one or more communication channels. For example, the communication interface may enable a user profile to generate a communication channel, post communications to the communication channel, and/or receive communications from the communication channel. The nature and extent of the interaction between a user profile and a communication channel enabled by a communication interface may depend on one or more properties of the communication channel as well as the privilege access identifier of the user profile. Examples of communication interfaces include group-based communication interfaces, messaging communication interfaces, and broadcast communication interfaces.

The term "communication channel" refers to a virtual communication environment (e.g., a virtual communication feed or a virtual communication session) configured to enable communication between a plurality of participants of the communication channel. The communication channel transmits communications from a first group of one or more participants (e.g., all participants of the communication channel) to a second group of one or more participants (e.g., all participants of the communication channel) and displays the transmitted communications for the second group of participants. The communication channel displays communications to the second group of participants in accordance with a display format. Examples of communication channels include group-based communication channels, ad-hoc communication channels, and broadcast communication channels.

The term "group-based communication system" refers to a communications software platform and associated hardware that is configured to support and maintain a plurality of communication interfaces, including one or more group-based communication interfaces, and all associated functionality. Some group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. The communication interfaces associated with a group-based communication system may also include, in addition to the one or more group-based communication interfaces, one or more messaging communication interfaces and/or one or more broadcast communication interfaces. Example group-based communication systems comprise supporting servers, client devices, and third party resources.

The term "group-based communication interface" refers to a communication interface configured to enable communication between a group of user profiles (e.g., a group of user profiles associated with employees of the Slack Corporation or a group of user profiles associated with employees of the ACME Corporation) of a computer system (e.g., a group-based communication system) via one or more group-based communication channels and as participants of the one or more group-based communication channels.

The term "group-based communication channel" refers to a communication channel configured to enable at least some participants of the group-based communication channel (e.g., validated users accessing the environment using client devices) to post group-based communications and to display the group-based communications to all participants of the group-based communication channel. The format of the group-based communication channel may appear differently to different participants of the group-based communication channel; however, the content of the group-based communication channel (i.e., group-based communications) will be displayed to each participant of the group-based communication channel. For instance, a common set of group-based communications will be displayed to each participant of the group-based communication channel such that the content of the group-based communication channel (i.e., group-based communications) will not vary per participant of the group-based communication channel.

The term "messaging communication interface" refers to a communication interface that enables communication between a group of user profiles of a computer system (e.g., the group-based communication system) via one or more ad-hoc communication channels. The messaging communication interface enables a first user profile to define a plurality of participants of an ad-hoc communication channel including the first user profile. For example, the messaging communication interface allows the first user profile to define a "chat group" and to communicate with the group using an ad-hoc communication channel.

The term "ad-hoc communication channel" refers to a communication channel created in response to a request by a first participant of the ad-hoc communication channel to send a communication to one or more other participants of the ad-hoc communication channel. The ad-hoc communication channel enables at least some participants of the ad-hoc communication channel to send communications (i.e., ad-hoc communications) to other participants of the ad-hoc communication channel and is configured to display to ad-hoc communications to all participants of the ad-hoc communication channel. The format of the ad-hoc communication channel may appear differently to different participants of the ad-hoc communication channel; however, the content of the ad-hoc communication channel (i.e., group-based communications) will be displayed to each participant of the ad-hoc communication channel.

The term "broadcast communication interface" refers to a communication interface that enables communications between a group of user profiles of a computer system (e.g., the group-based communication systems) via one or more broadcast channels. The broadcast communication interface enables one or more first user profiles to be source participants of a broadcast communication channel and one or more second user profiles to be recipient participants of the broadcast communication channel. The broadcast communication interface further enables the first user profiles to send communications using the broadcast communication channel and the second user profiles to receive communications using the broadcast communication channel. The broadcast communication interface may enable a third group of user profiles to be both source participants and recipient participants of the broadcast communication channel.

The term "broadcast communication channel" refers to a communication channel configured to enable one or more source participants to send communications to one or more recipient participants. Communications sent by source participants to the broadcast communication channel (i.e., broadcast communications) are displayed to all recipient participants of the broadcast communication channel. The format of broadcast communication channel may appear differently to different recipient participants of the broadcast communication channel; however, the content of the broadcast communication channel (i.e., broadcast communications) will be displayed to each recipient participant of the broadcast communication channel.

The term "user interface data" refers to data that is configured cause a computing device to present a particular user interface. The user interface data defines one or more properties associated with the particular user interface, such as contents of the particular user interface, a display format of the particular user interface, a display size of the particular user interface, a display layout of the particular user interface, etc. The user interface data may include data configured to be rendered by a web browser or other computer application on a computing device.

The term "conceptually hierarchical display layout" refers to a display layout for a user interface configured to present a group of communications that displays each first communication of the group of communications that is responsive to a second communication of the group of communications in a manner configured to indicate a conceptually hierarchical relationship between the first communication and the second communication. For example, if communications C4, C5, and C6 are responsive to communications C1, C2, and C3 respectively, a user interface having a conceptually hierarchical display layout may display communications C1-C3 as top-level communications and communications C4-C6 as replies to the top-level communications C1-C3 respectively.

The term "temporally linear display layout" refers to a display layout for a user interface configured to present a group of communication that displays the group of communications in an order defined by timestamps associated with the group of communications, i.e., by timestamps associated with times of transmission of communications and/or by timestamps associated with times of receipt of communications. For examples, if communications C1, C2, and C3 have timestamps T1, T2, and T3 respectively, where T1<T2<T3, a user interface having a temporally linear display layout may display the noted communications in the order C3→C2→C1.

The term "active access" refers to an access condition that, when obtained by a user profile with respect to a communication interface associated with one or more user profiles and one or more communication channels, authorizes the user profile to transmit communications to the one or more user profiles using the one or more communication channels and receive communications from the one or more user profiles using the one or more communication channels. For example, active access to a group-based communication interface may enable a user profile to: (i) transmit group-based communications to user profiles associated with the group-based communication interface using group-based communication channels, and (ii) receive the group-based communications from the user profiles associated with the group-based communication interface using the group-based communication channels. As another example, active access to a messaging communication interface may enable a user profile to: (i) transmit ad-hoc communications to user profiles associated with the messaging communication interface using ad-hoc communication channels; and (ii) receive the ad-hoc communications from the user profiles associated with the messaging communication interface using the ad-hoc communication channels. As yet another example, active access to a broadcast communication interface may enable a user profile to: (i) transmit broadcast communications to user profiles associated with the broadcast communication interface using the one or more broadcast channels, and (ii) receive the broadcast communications from the user profiles associated with the broadcast communication interface using the one or more broadcast channels.

The term "passive access" refers to an access condition that, when obtained by a user profile with respect to a communication interface associated with one or more user profiles and one or more communication channels, authorizes the user profile to receive communications from the one or more user profiles using the one or more communication channels but does not authorize the user profile to transmit communications to the one or more user profiles using the one or more communication channels. For example, passive access to a group-based communication interface may enable a user profile to receive group-based communications from user profiles associated with the group-based communication interface using group-based communication channels, but not transmit the group-based communications to the user profiles associated with the group-based communication interface using the group-based communication channels. As another example, active access to a messaging communication interface may enable a user profile to receive ad-hoc communications from user profiles associated with the messaging communication interface using ad-hoc communication channels, but not transmit the ad-hoc communications to the user profiles associated with the messaging communication interface using the ad-hoc communication channels. As yet another example, active access to a broadcast communication interface may enable a user profile to receive broadcast communications from user profiles associated with broadcast communication interface via one or more broadcast channels, but not transmit the broadcast communications to the user profiles associated with the broadcast communication interface using the one or more broadcast channels.

The term "general access privilege status" refers to an access privilege status for a computer system that includes one or more group-based communication interfaces based on which an associated user profile is authorized to obtain active access to at least one group-based communication interface of the one or more group-based communication interfaces. Detection of the general access privilege status for a user profile may cause the presentation of a general access user interface on a computing device of the user profile, The term "limited access privilege status" refers to an access privilege status for a computer system that includes one or more group-based communication interfaces based on which an associated user profile is not authorized to obtain active access to any group-based communication interfaces of the one or more group-based communication interfaces. Detection of limited access privilege status for a user profile may cause the presentation of a limited access user interface on a computing device of the user profile.

The term "general access user interface" refers to a user interface displayed on a computing device that enables the computing device to obtain active access to at least one group-based communication interface. The general access user interface may display user interface elements configured to enable sending messages to and receiving from each of one or more group-based communication channels of each group-based communication interface associated with a user profile of the computing device.

The term "limited access user interface" refers to a user interface displayed on a computing device that does not enable the computing device to obtain active access to any group-based communication interfaces. The limited access user interface may display user interface elements configured to enable active or passive access to at least one of one or more messaging communication interfaces associated with a user profile of the computing device and one or more broadcast communication interfaces associated with the user profile of the computing device.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present disclosure may operate. A user may access a group-based communication system 105 via a communication network 103 via one or more client devices 101A-B, such as the first client device 101A and the second client device natural language object. The group-based communication system 105 may comprise a group-based communication server 106 in communication with at least one group-based communication repository 107 and at least one user authorization repository 108.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 103 may include a cellular telephone, an 902.11, 902.16, 902.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In one embodiment, the protocol is a custom protocol of JSON objects sent via a Websocket channel. In one embodiment, the protocol is JSON over RPC, JSON over REST/HTTP, and the like.

In some embodiments of an exemplary group-based communication system 105, a message or messaging communication may be sent from a client device 101A-101N to a group-based communication platform 105. In various implementations, messages may be sent to the group-based communication platform 105 over communication network 103 directly by one of the client devices 101A-101B. The messages may be sent to the group-based communication system 105 via an intermediary such as a message server, and/or the like. For example, a client device 101A-101B may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101B may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
    <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
    <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
```

```
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a copy our
patent policy.</contents>
        <attachments>patent_policy.pdf</attachments>
    </message>
</auth_request>
```

In the illustrated embodiment, the group-based communication platform 105 comprises a plurality of message distribution servers 107A-107N configured to receive and/or disseminate messages transmitted between and/or to a plurality of client devices 101A-101N within a channel identified by a channel identifier and/or a group identifier, and to facilitate dissemination of those messages among client devices 101A-101N that collectively form the membership of the communication channel.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

A client device 101A-B may be any computing device as defined above. Electronic data received by the group-based communication system 105 from the client devices 101A-B may be provided in various forms and via various methods. For example, the client devices 101A-B may include desktop computers, laptop computers, smartphones, netbooks, tablet computers, wearables, and the like. An example architecture for a client device 101A-B is depicted in the apparatus 300 of FIG. 3.

In embodiments where a client device 101A-B is a mobile device, such as a smart phone or tablet, the client device 101A-B may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. Additionally or alternatively, the client device 101A-B may interact with the group-based communication system 105 via a web browser. As yet another example, the client device 101A-B may include various hardware or firmware designed to interface with the group-based communication system 105.

The group-based communication server 106 may be embodied as a computer or computers as known in the art. An example architecture for the group-based communication server 106 is depicted in the apparatus 200 of FIG. 2. The group-based communication server 106 may provide for sending electronic data and/or receiving electronic data from various sources, including but not limited to the client devices 101A-B. For example, the group-based communication server 106 may receive from the first client device 101A electronic data indicating a first active interface session on the first client device 101A. As another example, the group-based communication server 106 may send electronic data to the first client device 101A causing the first client device 101A to present an authorization command interface. As a further example, the group-based communication server 106 may receive electronic data from the second client device natural language object indicating receipt of an interface session request by the second client device natural language object and/or a first time associated with such receipt. As a yet another example, the group-based communication server 106 may send electronic data to the second client device natural language object causing the second client device natural language object to perform one or more limited user authorization routines.

The group-based communication repository 107 may be embodied as a data storage device such as a Network Attached Storage (NAS) device or devices, or as a separate database server or servers. The group-based communication repository 107 includes electronic data accessed and stored by the group-based communication server 106 to facilitate the operations of the group-based communication system 105. For example, the group-based communication repository 107 may include, without limitation, a plurality of shared interfaces, interface annotations, interface annotation instructions, display input data, etc. organized within the group-based communication repository 107.

In one embodiment, the group-based communication server 106 sends to and/or receives from the group-based communication repository 107 electronic data electronic data accessed and stored by the group-based communication server 106 to facilitate the operations of the group-based communication system 105. For example, the group-based communication server 106 may receive from the group-based communication repository 107 electronic data indicating any digital content in the group-based communication interfaces associated with the group-based communication system 105. As another example, the group-based communication server 106 may send to the group-based communication repository 106 electronic data indicating any modifications and/or additions to any group-based communication messages.

The user authorization repository 108 may include information needed to determine user authorization for one or more users of the group-based communication system 105. For example, the group-based communication repository 107 may include, without limitation, access privilege statuses identifiers, one or more user authorization databases, one or more administrator user profile designations, etc. The user authorization repository 108 may be embodied as a data storage device such as a Network Attached Storage (NAS) device or devices, or as a separate database server or servers. The user authorization repository 108 includes electronic data accessed and stored by the group-based communication server 106 to facilitate user authorization for the group-based communication system 105.

In one embodiment, the group-based communication server 106 may send to and/or receive from the user authorization repository 108 electronic data related to user authorization and/or receive from the user authorization repository 108 electronic data related to user authorization. For example, the group-based communication server 106 may receive from the user authorization repository 108 electronic data indicating access privilege identifiers. As another example, the group-based communication server 106 may send to the user authorization repository 108 electronic data indicating user identifiers and/or access requests. As yet another example, the group-based communication server 106 may send to the user authorization repository 108 modification commands and/or modifications requests related to access privilege statuses.

An example architecture for the group-based communication server 106 is depicted in the apparatus 200 of FIG. 2. As depicted in FIG. 2, the apparatus 200 includes processor 202, memory 204, input/output circuitry 206, communications circuitry 208, group-based communication circuitry 210, and user authorization circuitry 212. The apparatus 200 may be configured to execute the operations described herein with respect to FIGS. 1-12. Although these components 202-210 are described with respect to functional limitations, it should be understood that the particular implementations necessarily include the use of particular hardware. It should also be understood that certain of these components 202-212 may include similar or common hardware. For example, two sets of circuitries may both leverage use of the same processor, network interface, storage medium, or the like to perform their associated functions, such that duplicate hardware is not required for each set of circuitries.

In one embodiment, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 101A-B to enable message sharing/dissemination therebetween. The processor 202 ensures that messages intended for exchange between the client devices 101A-B within the particular communication channel are properly disseminated to those client devices 101A-B for display within respective display windows provided via the client devices 101A-B.

Moreover, the processor 202 may be configured to synchronize messages exchanged on a particular communication channel with a database for storage and/or indexing of messages therein. In certain embodiments, the processor 202 may provide stored and/or indexed messages to the interface computing entity 109 for dissemination to client devices 101A-B.

In one embodiment, the apparatus 200 may include input/output circuitry 206 that may, in turn, be in communication with processor 202 to provide output to the user and, in one embodiment, to receive an indication of a user input. The input/output circuitry 206 may comprise a user interface and may include a display, and may comprise a web user interface, a mobile application, a client device, a kiosk, or the like. In one embodiment, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network.

For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Group-based communication circuitry 210 includes hardware configured to execute operations in response to requests by client devices 101A-B when such requests require retrieval and/or modification of data stored in the group-based communication repository 107. For example, the group-based communication circuitry 210 may process a request to create a group-based communication interface. The group-based communication circuitry 210 may utilize processing circuitry, such as the processor 202, to perform these actions. However, it should also be appreciated that, In one embodiment, the group-based communication circuitry 210 may include a separate processor, specially configured Field Programmable Gate Array (FPGA), or Application Specific Integrated Circuit (ASIC) for performing the functions described herein. The group-based communication circuitry 210 may be implemented using hardware components of the apparatus configured by either hardware or software for implementing these planned functions.

User authorization circuitry 212 includes hardware configured to execute operations in response to requests by client devices 101A-B when such requests require retrieval and/or modification of data in the user authorization repository 108. For example, the user authorization circuitry 212 may process a request to modify an access privilege identifier associated with a user profile in the user authorization repository 108. As another example, the user authorization circuitry 212 may process a request to modify at least one authorization database in the user authorization repository 108. As yet another example, the user authorization circuitry 212 may process a request to modify one or more administrator user profile designations in the user authorization repository 108. The user authorization circuitry 212 may utilize processing circuitry, such as the processor 202, to perform these actions. However, it should also be appreciated that, In one embodiment, the user authorization circuitry 212 may include a separate processor, specially configured Field Programmable Gate Array (FPGA), or Application Specific Integrated Circuit (ASIC) for performing the functions described herein. The user authorization circuitry 212 may be implemented using hardware components of the apparatus configured by either hardware or software for implementing these planned functions.

It is also noted that all or some of the information discussed herein can be based on data that is received, generated and/or maintained by one or more components of apparatus 200. In one embodiment, one or more external systems (such as a remote cloud computing and/or data storage system) may also be leveraged to provide at least some of the functionality discussed herein.

An example architecture for a client device 101A-B is depicted in the apparatus 300 of FIG. 3. As depicted in FIG. 3, the apparatus 300 includes processor 301, memory 303, input/output circuitry 305, and communications circuitry 307. Although these components 301-307 are described with respect to functional limitations, it should be understood that the particular implementations necessarily include the use of particular hardware. It should also be understood that certain of these components 301-307 may include similar or common hardware. For example, two sets of circuitries may both leverage use of the same processor, network interface, storage medium, or the like to perform their associated functions, such that duplicate hardware is not required for each set of circuitries.

In one embodiment, the processor 301 (and/or co-processor or any other processing circuitry assisting or otherwise associated with the processor) may be in communication with the memory 303 via a bus for passing information among components of the apparatus. The memory 303 is non-transitory and may include, for example, one or more volatile and/or non-volatile memories. In other words, for example, the memory 303 may be an electronic storage device (e.g., a computer-readable storage medium). The memory 303 may be configured to store information, data, content, applications, instructions, or the like for enabling the apparatus 300 to carry out various functions in accordance with example embodiments of the present disclosure. For example, the memory 303 may be configured to cache messages exchanged on one or more group-based communication channels, such that the processor 301 may provide various messages to client devices (e.g., on an as needed or as requested basis).

The processor 301 may be embodied in a number of different ways and may, for example, include one or more processing devices configured to perform independently. In some preferred and non-limiting embodiments, the processor 301 may include one or more processors configured in tandem via a bus to enable independent execution of instructions, pipelining, and/or multithreading.

In some preferred and non-limiting embodiments, the processor 301 may be configured to execute instructions stored in the memory 303 or otherwise accessible to the processor 301. In some preferred and non-limiting embodiments, the processor 301 may be configured to execute hard-coded functionalities. As such, whether configured by hardware or software methods, or by a combination thereof, the processor 301 may represent an entity (e.g., physically embodied in circuitry) capable of performing operations according to an embodiment of the present disclosure while configured accordingly. Alternatively, as another example, when the processor 301 is embodied as an executor of software instructions, the instructions may specifically configure the processor 301 to perform the algorithms and/or operations described herein when the instructions are executed.

In one embodiment, the apparatus 300 may include input/output circuitry 305 that may, in turn, be in communication with processor 301 to provide output to the user and, In one embodiment, to receive an indication of a user input. The input/output circuitry 305 may comprise a user interface and may include a display, and may comprise a web user interface, a mobile application, a client device, a kiosk, or the like. In one embodiment, the input/output circuitry 305 may also include a keyboard, a mouse, a joystick, a touch screen, touch areas, soft keys, a microphone, a speaker, or other input/output mechanisms.

The communications circuitry 307 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 307 may include, for example, a network interface for enabling communications with a wired or wireless communication network. For example, the communications circuitry 307 may include one or more network interface cards, antennae, buses, switches, routers, modems, and supporting hardware and/or software, or any other device suitable for enabling communications via a network. Additionally or alternatively, the communications circuitry 307 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In one embodiment, one or more external systems (such as a remote cloud computing and/or data storage system) may also be leveraged to provide at least some of the functionality discussed herein.

The term "circuitry" should be understood broadly to include hardware and, in one embodiment, software for configuring the hardware. With respect to components of each apparatus 200, 300, the term "circuitry" as used herein should therefore be understood to include particular hardware configured to perform the functions associated with the particular circuitry as described herein. For example, in one embodiment, "circuitry" may include processing circuitry, storage media, network interfaces, input/output devices, and the like. In one embodiment, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 301 may provide processing functionality, the memory 303 may provide storage functionality, the communications circuitry 307 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication system may comprise one or more databases configured for storing and/or indexing messages exchanged within various group-based communication channels.

Example Data Flows of Embodiments of the Present Disclosure

Various embodiments of the present disclosure relate generally to multi-modal user authorization in group-based communication systems. More specifically, various embodiments of the present disclosure are related to group-based communication systems that provide multi-modal user authorization using access privilege identifiers and limited access user interfaces. Various embodiments described hereinafter provide many technical improvements over computer functionalities by enabling providers of group-based communication systems to enforce more flexible user authorization parameters in those group-based communication systems. In addition, various embodiments of the present disclosure provide many technical improvements over computer functionalities by providing user authorization protocols that facilitate multi-modal user authorization in group-based communication systems. Furthermore, various embodiments of the present disclosure provide many technical improvements over computer functionalities by providing seamless and/or smooth transitions between user interfaces in the event of modifications in access privilege identifiers.

Multi-Modal User Authorization

FIG. 4 is an example flow diagram illustrating performing user authorization in a group-based communication system. The process 400 illustrated in FIG. 4 is described herein with reference to a group-based communication server, such as the group-based communication server 106 of FIG. 1, but can be performed by any system of one or more computers, such as a system that includes the group-based communication server 106 of FIG. 1. Each block of the flowchart, and combinations of blocks in the flowchart, may be implemented by various means such as hardware, firmware, circuitry and/or other devices associated with execution of software including one or more computer program instructions. For example, one or more of the procedures described in FIG. 4 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As depicted in FIG. 4, the process 400 starts at block 402 by receiving a first access request to enable a the first client device associated with a first user profile to access the group-based communication system. For example, the group-based communication server 106 of the group-based communication system 105 may receive the first access request from a client device 101A-B associated with the first user profile via the communication network 103. The first access request may, for example, be an HTTP command (e.g., an HTTP GET command) from the first client device associated with the first user profile, where the HTTP command includes a request for accessing particular data associated with the group-based communication system (e.g., particular data stored in the group-based communication repository 107) that the first user profile is authorized to access.

In some embodiments, the first access request may include data items (e.g., a user identification) that directly or indirectly indicate a first access privilege status associated with the first access request. For example, the first access request may include a first access privilege identifier that directly indicates the first access privilege status associated with the first access request. As another example, the first access request may include a user identifier of the first user profile, and a user profile may directly indicate the first access privilege status associated with the first access request (for example, the group-based communication server 106 may be configured to recognize that access requests by user identifiers that have a certain form, begin with certain digits, and/or fall within a certain range of values have a limited access privilege status). As yet another example, the first access request may include data items (e.g., a user identifier of the first user profile) that the group-based communication server 106 can use to retrieve (e.g., by querying a user authorization database) the first access privilege identifier associated with the first access request.

In some embodiments, the first client device may automatically generate the first access request in response to identifying indications of particular actions by a first user associated with the first user profile. For example, the first user profile may indicate that the first user has opened a particular computer application and/or has requested to login to a particular website. The first client device may identify such indications and, in response, generate the first access request and transmit the first access request to a server (e.g., the group-based communication server 106 of the group-based communication system).

To generate the first access request, the first client device may use data stored on the first client device and/or data obtained from one or more other computing entities. For example, the first client device may determine a user identifier associated with the first user profile and/or a first access privilege identifier associated with the first access request based on information stored on the first client device, i.e., information stored in one or more system files of the first client device. As another example, the first client device may determine a user identifier associated with the first user profile and/or a first access privilege identifier associated with the first access request based on information obtained from an external computing entity, i.e., a computing entity associated with the group-based communication system 105, such as the group-based communication server 106 and/or the user authorization repository 108.

The process 400 continues at block 404 by determining, based on a first access privilege identifier associated with the first access request, a first access privilege status associated with the first user profile. For example, the group-based communication server 106 may determine the first access privilege identifier and determine the first access privilege status identifier based on the determined first access privilege identifier.

In some embodiments, determining the first access privilege status identifier includes determining the access privilege status based on one or more data items in the first access request. For example, in some embodiments, the first access request includes the first access privilege identifier. In at least some of those embodiments, determining the first access privilege status includes retrieving the first access privilege identifier from the first access privilege status and determining the first access privilege status based on the retrieved first access privilege identifier. In some embodiments, determining the first access privilege status includes identifying a first user identifier associated with the first user profile based on the first access request; and querying a user authorization database based on the user identifier to retrieve the first access privilege identifier.

In some embodiments, the first access privilege status may be one of a plurality of possible access privilege statuses. Each possible access privilege status may enable the first user profile to obtain active access, passive access, or neither active access nor passive access to each communication interface of one or more communication interfaces associated with the group-based communication interface. In general, if the group-based communication system is associated with X communication interfaces, the group-based communication interfaces may be associated with up to $3^X$ possible access privilege statuses.

For example, if a group-based communication system is associated with one group-based communication interface and one messaging communication interface, the group-based communication interface may be associated with the following nine access privilege statuses: (i) an access privilege status that enables active access to the group-based communication interface and active access to the messaging communication interface, (ii) an access privilege status that enables active access to the group-based communication interface and passive access to the messaging communication interface, (iii) an access privilege status that enables active access to the group-based communication interface and neither active nor passive access to the messaging communication interface, (iv) an access privilege status that passive active access to the group-based communication interface and active access to the messaging communication interface, (v) an access privilege status that enables passive access to the group-based communication interface and passive access to the messaging communication interface, (vi) an access privilege status that enables passive access to the group-based communication interface and neither active nor passive access to the messaging communication interface, (vii) an access privilege status that enables neither active nor passive access to the group-based communication interface and active access to the messaging communication interface, (viii) an access privilege status that enables neither active nor passive access to the group-based communication interface and passive access to the messaging communication interface, and (ix) an access privilege status that enables neither active nor passive access to the group-based communication interface and neither active nor passive access to the messaging communication interface.

In some embodiments, the possible access privilege statuses include one or more general access privilege statuses and one or more limited access privilege statuses. Because of operational costs associated with enabling access to group-based communication interfaces as well as the importance of group-based communication interfaces for performing tasks with organizational and collective significance (e.g., for tasks related to management of projects), the general access privilege statuses and the limited access privilege statuses are distinguished based on the enablement of active access to group-based communication interfaces by the general privilege statuses to and the lack of enablement of active access to the group-based communication interfaces by the limited access privilege statuses. In other words, a general access privilege status is an access privilege status based on which a user profile is authorized to obtain active access to at least one group-based communication interface of the group-based communication system, while a limited access privilege status is an access privilege status based on which a user profile is not authorized to obtain active access to at least one group-based communication interface of the group-based communication.

In some embodiments, in addition to enabling active access to one or more group-based communication interfaces of the group-based communication system, a general access privilege status enables one or more of active access to one or more first messaging communication interfaces, passive access to one or more second messaging communication interfaces, active access to one or more first broadcast communication interfaces, and passive access to one or more second broadcast communication interfaces. For example, an example general access privilege status associated with a user profile may enable the associated user profile to: (i) send communications to and receive communications from a group-based communication interface associated with the user profile, via one or more group-based communication channels associated with the group-based communication interface; (ii) send communications to and receive communications from a messaging communication interface associated with the user profile, via one or more ad-hoc communication channels associated with the messaging communication interface; (iii) send communications to and receive communications from a first broadcast communication interface associated with the user profile, using a first broadcast communication channel associated with the first broadcast communication interface; and (iv) receive communications from a second broadcast communication interface associated with the user profile, using a second broadcast communication channel associated with the second broadcast communication interface.

In some embodiments, a limited access privilege status enables passive access to one or more group-based communication interfaces of the group-based communication systems. In some embodiments, a limited access privilege status disables and/or fails to enable either active access or passive access to any group-based communication interface of the group-based communication system. In some embodiments, a limited access privilege status enables one or more of active access to one or more first broadcast communication interfaces and passive access to one or more second broadcast communication interfaces.

The process 400 continues at step 406 by transmitting, to the first client device associated with the first user profile, first user interface data associated with a general access user interface for display by the first client device in response to determining that the first access privilege status is a general access privilege status. In some embodiments, if the first access privilege status is a general access privilege status, the group-based communication server 106 transmits first user interface data configured to cause the first client device to present a general access user interface.

The general access user interface may enable the first client device to obtain active access to one or more first group-based communication interfaces of the group-based communication system. Each first group-based communication interface may enable communication between one or more first user profiles of the group-based communication system via one or more first group-based communication channels associated with the first group-based communication interface. The general access user interface may display each one or more first communications for a first group-based communication channel associated with a first group-based communication interface based on a conceptually hierarchical display layout.

A general access user interface may include user interface elements configured to enable the first user profile to send messages to and receive messages from one or more group-based communication interfaces. The general access user interface may further include user interface elements configured to enable the first user profile to select to interact with a particular group-based communication interface of one or more group-based communication interfaces associated with the first user profile and/or select to interact with a particular group-based communication channel of one or more group-based communication channels associated with a selected group-based communication interface. The general access user interface may further include user interface elements configured to enable the first user profile to switch from a selected group-based communication interface to another group-based communication interface associated with the first user profile and/or switch from a selected group-based communication channel to another group-based communication channel associated with the first user profile.

If the general access user interface is configured to enable active access to a messaging communication interface, the general access user interfaces may include user interface elements configured to enable the first user profile to initiate an ad-hoc communication channel associated with the messaging communication interface, select to view communications associated with an ad-hoc communication channel, send communications to a selected ad-hoc communication channel, and/or switch from a selected ad-hoc communication channel associated with the messaging communication interface to another communication channel associated with the messaging communication interface. If the general access user interface is configured to enable passive access to a broadcast communication interface, the general access user interface is configured to enable the first user profile to select to view communications from one or more broadcast communication channels associated with the broadcast communication interface and/or switch from a selected broadcast communication channel associated with the broadcast communication interface to another broadcast communication channel associated with the broadcast communication interface.

FIGS. 5A-5C depict an example general access user interface 500. As depicted in FIGS. 5A-5B, the example general access user interface 500 enables a user profile (i.e., a user profile associated with Pablo Bailey) to access a group-based communication interface (i.e., a group-based communication interface associated with Butterkup, Inc.). The example general access user interface 500 includes user interface elements configured to enable the first user profile to access group-based communication channels associated with the group-based communication interface, such as the user interface element 520 configured to enable the first user profile to access the # office group-based communication channel. As indicated by the highlighted status of the user interface element 520, the user profile has currently selected to view communications from and send communications to the # office group-based communication channel. The example general access user interface 500 further depicts one or more group-based communications associated with the # office group-based communication channel, such as a communication by a user profile associated with "PJ Duncan" that is depicted using the user interface element 530.

The example general access user interface 500 further includes user interface elements configured to enable the first user profile to engage in ad-hoc communication channels, such as the user interface element 540 configured to enable the first user profile to engage in an ad-hoc communication with a second user profile associated with Noreen Zamboni. The example general access user interface 500 further includes user interface 550 configured to enable the user profile to initiate an ad-hoc communication channel.

As depicted in FIG. 5B, the user profile can respond to the communication depicted by the user interface element 530 by interacting with (e.g., clicking on and/or touching) the user interface element 560 in the example general access user interface 500. As depicted in FIG. 5C, the noted interaction will cause the example general access user interface 500 to present a user interface element 570 that enables the user profile to send a communication as a response to the communication depicted by the user interface element 530. Upon submission of the responsive communication, the example general access user interface 500 will add a user interface element 580 below the user interface element 530 to indicate that the communication depicted in user interface element 530 has a responsive communication. In other words, the example general access user interface 500 will display an indication of the responsive communication in a manner that displays a conceptually hierarchical relationship between the communication depicted by user interface element 530 (which is depicted on a top-level using a user interface 530 that includes contents of the communication) and the responsive communication (which is depicted on a bottom-level using a user interface element 580 that is merely a link for viewing the communication).

Returning to FIG. 4, the process 400 continues at step 408 by transmitting, to the first client device associated with the first user profile, second data associated with a limited access user interface for display by the first user device in response to determining that the first access privilege status is a limited access privilege status. In some embodiments, if the first access privilege status is a limited access privilege status, the group-based communication server 106 transmits second user interface data configured to cause the first client device to present a limited access user interface.

The limited access user interface may enable the first client device to maintain active access to a first messaging communication interface associated with the group-based communication system. The messaging communication interface may enable communication between one or more second user profiles of the group-based communication system via one or more first ad-hoc communication channels. Each first ad-hoc communication channel may be associated with one or more third user profiles of the one or more second user profiles (e.g., one or more third user profiles indicating by a particular user profile of the one or more third user profile upon transmitting a request to initiate the ad-hoc communication channel). The limited access user interface may display each one or more second communications for a first ad-hoc communication channel based on a temporally linear display layout.

The limited access user interface may include elements configured to enable the first user profile to select a communication interface associated with the first user profile, such as a group-based communication interface or a broadcast communication interface, and/or switch from a selected communication interface associated with the user profile to another communication interface associated with the user profile. The limited access user interface may further include elements configured to enable the first user profile to select a communication channel in a communication interface associated with the first user profile, e.g., an ad-hoc communication channel associated with a messaging communication interface and/or a broadcast communication interface associated with a broadcast communication interface, and/or switch from a selected communication channel in a communication interface associated with the first user profile to another communication channel in a communication interface associated with the first user profile.

FIG. 6 depicts an example limited access user interface 600. The example limited access user interface 600 includes user interface elements configured to enable a user profile (i.e., a first user profile associated with "Tina Chen") to receive communications from one or more broadcast communication channels associated with a broadcast communication interface (i.e., a broadcast communication interface associated with the organization "Acme Corp"), such as user interface element 610 configured to enable the user profile to receive communications from the # help-benefits broadcast communication channel. As indicated by the bolded status of the user interface element 610 in the example limited access user interface 600, the user profile has not viewed all of the communications received using the # help-benefits broadcast communication channel.

The example limited access user interface 600 further includes user interface elements configured to enable the user profile to engage in ad-hoc communications using a messaging communication interface (e.g., a messaging communication interface associated with the organization "Acme Corp"), such as user interface element 620 configured to enable the user profile to engage in an ad-hoc communication channel with a user profile associated with the user "Sara Culver." As indicated by the highlighted status of user interface element 620 in the example limited access user interface 600, the user profile has currently selected to send communications to and receive communications from the ad-hoc communication channel between the user profile and Sarah Culver.

The example limited user interface 600 further includes user interface element 630 configured to enable the user profile to initiate a new ad-hoc communication channel. Moreover, the example limited access user interface 600 further includes user interface elements configured to display one or more ad-hoc communications, such as the user interface element 640 configured to display an ad-hoc communication. The one or more communication messages displayed by the example limited user interface 600 may be displayed in an ordered defined by a temporally linear display layout, such that most recent communications appear at the bottom of the scrollable window 650.

The user interface data, such as the first user interface data and/or the second user interface data may include one or more of data configured to be rendered by a web browser or other software application on the first client device (e.g., a native application associated with the group-based communication server and configured to render user interfaces associated with the group-based communication system), data indicating one or more properties of a user interface (e.g., a general access user interface or a limited access user interface), data indicating contents of one or more communication interfaces associated with the group-based communication system, etc. For example, the user interface data may include data in a hyper-text markup language (HTML). As another example, the user interface data may include data configured to invoke a user interface presentation module on the first client device.

Access Privilege Status Modification

FIG. 7 is an example flow diagram illustrating modifying the first access privilege status. The process 700 illustrated in FIG. 7 is described herein with reference to a group-based communication server, such as the group-based communication server 106 of FIG. 1, but can be performed by any system of one or more computers, such as a system that includes the group-based communication server 106 of FIG. 1. Each block of the flowchart, and combinations of blocks in the flowchart, may be implemented by various means such as hardware, firmware, circuitry and/or other devices associated with execution of software including one or more computer program instructions. For example, one or more of the procedures described in FIG. 7 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

Process 700 begins at step 702 by receiving a modification command including instructions to modify the first access privilege status. For example, the group-based communication server 106 may receive the modification command from a client device associated with an administrator user profile for the group-based communication system. The client computing device associated with the administrator user profile for the group-based communication system may generate the modification command in response to an indication by the administrator user profile that an administrator user associated with the administrator has consented to a particular modification in the first access privilege status.

In some embodiments, the client device associated with the administrator user profile generates the modification command in response to a modification request by the first user profile to modify the first access privilege status and/or a modification request by a particular user profile to modify the first access privilege status, where the particular user profile is authorized to access at least one group-based communication interface of the group-based communication system. For example, in some embodiments, the modification command may be generated by the computing device associated with the administrator user profile when the administrator user profile indicates acceptance of a modification request. The modification request may in turn be generated by the first computing device associated with the first user profile indicates acceptance of a modification recommendation by a client device associated with a user profile authorized to access at least one group-based communication interface of the group-based communication system.

FIG. 8 is an example modification recommendation user interface 800. The example modification recommendation user interface 800 is a general access user interface that enables a first user profile (i.e., the user profile associated with Sara Culver) to access four group-based communication channels (e.g., the # sales-calls group-based communication channel) associated with a group-based communication interface (i.e., the group-based communication interface "Acme Sales"). The example modification recommendation user interface 800 includes a user interface element 810 that includes a group-based communication message from the first user profile with a dynamic reference to (i.e., a "tag" of) a second user profile (i.e., a user profile associated with Tina Chen). In response to submission of the group-based communication message depicted in the user interface element 810, the example modification recommendation user interface 800 displays a user interface element 820. The user interface element 820 contains text recommending that the first user profile asks, by interacting with user interface element 830, the second user profile to cause transmission of a modification request for modifying an access privilege status of the second user profile in order to enable the second user profile active access to the group-based communication interface.

FIG. 9 is an example modification request user interface 900. The example modification request user interface 900 is a limited access user interface that enables the second user profile (i.e., the second user profile associated with Tina Chen) to receive broadcast communications using four broadcast communication channels (e.g., the # help-benefits channel). The example modification request user interface 900 further enables the second user profile to initiate new ad-hoc communication channels and/or engage in existing ad-hoc communication channels (e.g., the selected ad-hoc communication channel with "slackbot," as indicated by the user interface element 620). The example modification request user interface 900 includes an indication of the modification recommendation by the first user profile in user interface element 910. User interface element 910 includes an ad-hoc communication displayed using an ad-hoc communication channel configured to transmit communications related to operation of the group-based communication system, i.e., the "slackbot" ad-hoc communication channel. User interface element 910 includes user interface element 920. By interacting with the user interface element 920, the second user profile can cause the client device associated with the second user profile to transmit a modification request to the group-based communication server.

FIG. 10 is an example modification command user interface 1000. The example modification command user interface 1000 may be presented to an administrator user profile for the "ACME Corp" group-based communication system. The example modification command user interface 1000 includes user interface 1010, which depicts a modification request by Tina Chen to "upgrade" from a limited access privilege status to a general access privilege status. The example modification command user interface 1000 further includes a user interface element 1020 configured to enable the administrator user profile to accept the modification request, e.g., in response to detecting a particular action by an administrator user associated with the administrator user profile.

Returning to FIG. 7, the process 700 continues at block 704 by modifying the first active authentication status based on the modification command. The group-based communication server may process the modification command (e.g., using the user authorization circuitry 212 of the group-based communication server 106) by modifying the access privilege status stored in the user authentication repository 108 and/or by transmitting a new active authentication status to the first user profile, e.g., to be included in future access requests. After modifying the first access privilege status, future access requests by the first user profile may present user interfaces in accordance with the modified first access privilege status.

FIGS. 11A-B depict an example post-modification general access user interface 1100. As depicted in FIGS. 11A-B, the example post-modification general access user interface 1100 is configured to enable access by the second user profile (i.e., the second user profile associated with "Tina Chen") to a group-based communication channel (i.e., the # sales-calls communication channels) using the user interface element 1120. As further depicted in FIGS. 11A-B, the example post-modification general access user interface 1100 is configured to enable access by the second user profile to ad-hoc communication channels. For example, the user interface element 1130 in the example post-modification general access user interface 1100 is configured to enable access by the second user profile to an ad-hoc communication channel with "slackbot."

As depicted in FIG. 11A, the example post-modification general access user interface 1100 includes, as part of the group-based communication messages for the selected group-based communication interface # sales-calls, a communication (depicted by user interface element 110) informing the second user profile of membership in the # sales-calls communication channel. Moreover, as depicted in FIG. 11B, the example post-modification general access user interface 1100 includes, as part of the ad-hoc communication messages for the selected "slackbot" ad-hoc communication channel, a communication (depicted by user interface element 1140) informing the second user profile of the modification in the first access privilege status.

Additional Implementation Details

Although example processing systems have been described in FIGS. 1-3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. A computer-implemented method for user authorization in a group-based communication system, the computer-implemented method comprising:
receiving a first access request to enable a first client device associated with a first user profile to access the group-based communication system;
identifying a user identifier associated with the first user profile based on the first access request;
retrieving an access privilege identifier by querying a user authorization database based on the user identifier, the access privilege identifier being initially established in the user authorization database by a user of an administrator profile of the group-based communication system;
determining, based on the access privilege identifier associated with the first access request, a first access privilege status associated with the first user profile, that the first user profile is associated with a general access privilege status or a limited access privilege status;
in response to determining that the first user profile is associated with the general access privilege status, transmitting, to the first client device associated with the first user profile, first user interface data associated with a general access user interface for display by the first client device, wherein the general access user interface enables the first client device to access one or more group-based communication interfaces of the group-based communication system, and wherein the general access user interface displays one or more first communications associated with the one or more group-based communication interfaces via a first display layout; and
in response to determining that the first user profile is associated with the limited access privilege status, transmitting, to the first client device, second user interface data associated with a limited access user interface for display by the first client device, wherein the limited access user interface enables the first client device to access a messaging communication interface associated with the group-based communication system, and wherein the limited access user interface displays one or more second communications associated with the messaging communication interface via a second display layout.

2. The computer-implemented method of claim 1, wherein the limited access user interface is further configured to enable the first client device to obtain limited access to the one or more group-based communication interfaces.

3. The computer-implemented method of claim 1, wherein the limited access user interface is further configured to disable the first client device from obtaining access to the one or more group-based communication interfaces.

4. The computer-implemented method of claim 1, wherein the limited access user interface is further configured to enable the first client device to obtain access to a broadcast communication interface associated with the group-based communication system.

5. The computer-implemented method of claim 1, wherein the first access request includes the access privilege identifier.

6. The computer-implemented method of claim 1, further comprising:
receiving a modification command, the modification command comprising instructions to modify an access privilege status associated with the first user profile; and
modifying the access privilege status based on the modification command.

7. The computer-implemented method of claim 6, wherein the modification command is received from a second client device, the second client device associated with the administrator profile for the group-based communication system.

8. The computer-implemented method of claim 6, wherein the modification command is generated in response to a first modification request received from the first client device associated with the first user profile.

9. The computer-implemented method of claim 6, wherein the modification command is generated in response to a second modification request received from a second computing device associated with a second user profile authorized to access at least one group-based communication interface of the group-based communication system.

10. An apparatus comprising at least one processor and at least one non-transitory memory comprising program code, wherein the at least one non-transitory memory and the program code are configured to, with the at least one processor, cause the apparatus to at least perform an operation comprising:
receiving a first access request to enable a client device associated with a user profile to access a group-based communication system;
identifying a user identifier associated with the user profile based on the first access request;
retrieving an access privilege identifier by querying a user authorization database based on the user identifier, the access privilege identifier being initially established in the user authorization database by a user of an administrator profile of the group-based communication system;
determining, based on the access privilege identifier associated with the first access request, that the user profile is associated with a general access privilege status or a limited access privilege status;
in response to determining that the user profile is associated with the general access privilege status, transmitting, to the client device associated with the user profile, first user interface data associated with a general access user interface for display by the client device, wherein the general access user interface enables the client device to access one or more group-based communication interfaces of the group-based communication system, and wherein the general access user interface displays one or more first communications associated with the one or more group-based communication interfaces via a first display layout; and
in response to determining that the user profile is associated with the limited access privilege status, transmitting, to the client device, second user interface data associated with a limited access user interface for display by the client device, wherein the limited access user interface enables the client device to access a messaging communication interface associated with the group-based communication system, and wherein the limited access user interface displays one or more second communications associated with the messaging communication interface via a second display layout.

11. The apparatus of claim 10, wherein the limited access user interface is further configured to enable the client device to obtain limited access to the one or more group-based communication interfaces.

12. The apparatus of claim 10, wherein the limited access user interface is further configured to disable the client device from obtaining access to the one or more group-based communication interfaces.

13. The apparatus of claim 10, wherein the limited access user interface is further configured to enable the client device to obtain access to a broadcast communication interface associated with the group-based communication system.

14. The apparatus of claim 10, wherein the first access request includes the access privilege identifier.

15. The apparatus of claim 10, the method further comprising:
   receiving a modification command, the modification command comprising instructions to modify an access privilege status associated with the user profile; and
   modifying the access privilege status based on the modification command.

16. A non-transitory computer storage medium comprising instructions configured to cause one or more processors to at least perform operations comprising:
   receiving a first access request to enable a client device associated with a user profile to access a group-based communication system;
   identifying a user identifier associated with the user profile based on the first access request;
   retrieving an access privilege identifier by querying a user authorization database based on the user identifier, the access privilege identifier being initially established in the user authorization database by a user of an administrator profile of the group-based communication system;
   determining, based on the access privilege identifier associated with the first access request, that the user profile is associated with a general access privilege status or a limited access privilege status;
   in response to determining that the user profile is associated with the general access privilege status, transmitting, to the client device associated with the user profile, first user interface data associated with a general access user interface for display by the client device, wherein the general access user interface enables the client device to access one or more group-based communication interfaces of the group-based communication system, and wherein the general access user interface displays one or more first communications associated with the one or more group-based communication interfaces via a first display layout; and
   in response to determining that the user profile is associated with the limited access privilege status, transmitting, to the client device, second user interface data associated with a limited access user interface for display by the client device, wherein the limited access user interface enables the client device to access a messaging communication interface associated with the group-based communication system, and wherein the limited access user interface displays one or more second communications associated with the messaging communication interface via a second display layout.

17. The non-transitory computer storage medium of claim 16, wherein the limited access user interface is further configured to enable the client device to obtain limited access to the one or more group-based communication interfaces.

18. The non-transitory computer storage medium of claim 16, wherein the limited access user interface is further configured to disable the client device from obtaining access to the one or more group-based communication interfaces.

19. The non-transitory computer storage medium of claim 16, further comprising:
   receiving a modification command, the modification command comprising instructions to modify an access privilege status associated with the first user profile; and
   modifying the access privilege status based on the modification command.

20. The non-transitory computer storage medium of claim 19, wherein the modification command is received from a second client device, the second client device associated with the administrator profile for the group-based communication system.

* * * * *